(12) United States Patent
Guo et al.

(10) Patent No.: US 12,165,228 B1
(45) Date of Patent: Dec. 10, 2024

(54) SYSTEMS AND METHODS OF GENERATING FEATURE SETS FOR ENTITY EVALUATION

(71) Applicant: Federal Home Loan Mortgage Corporation (Freddie Mac), McLean, VA (US)

(72) Inventors: Dina Guo, McLean, VA (US); Biao Yang, Vienna, VA (US); Steven Guggenmos, Herndon, VA (US); Jun Li, Potomac, MD (US); Jae-kyun Patrick Chu, Reston, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 479 days.

(21) Appl. No.: 17/381,586

(22) Filed: Jul. 21, 2021

(51) Int. Cl.
*G06Q 50/163* (2024.01)
*G06F 18/24* (2023.01)

(52) U.S. Cl.
CPC ........... *G06Q 50/163* (2013.01); *G06F 18/24* (2023.01)

(58) Field of Classification Search
CPC .................................................. G06Q 50/16
See application file for complete search history.

(56) References Cited

U.S. PATENT DOCUMENTS

| | | | |
|---|---|---|---|
| 7,974,930 B2 | 7/2011 | Brock, Sr. | |
| 8,060,450 B2 | 11/2011 | Brock, Sr. | |
| 10,198,735 B1 * | 2/2019 | Humphries | G06Q 30/02 |
| 10,460,406 B1 * | 10/2019 | Humphries | G06Q 30/0645 |
| 10,789,278 B1 * | 9/2020 | Florance | G06F 16/9537 |
| 11,068,911 B1 * | 7/2021 | Humphries | G06Q 30/02 |
| 2012/0072357 A1 * | 3/2012 | Bradford | G06Q 30/0283 705/306 |

(Continued)

FOREIGN PATENT DOCUMENTS

WO WO-2022032332 A1 * 2/2022 ............. G06N 20/20

OTHER PUBLICATIONS

Abdul-Rahman, S., Nor, H. Z., Ismail, I., & Mutalib, S. (2021). Advanced machine learning algorithms for house price prediction: Case study in kuala lumpur. International Journal of Advanced Computer Science and Applications, 12(12) (Year: 2021).*

(Continued)

*Primary Examiner* — Maria C Santos-Diaz
(74) *Attorney, Agent, or Firm* — Finch & Maloney PLLC

(57) ABSTRACT

In an illustrative embodiment, an automated system determines rental income and location quality for geographic regions using customized data sets. The system can generate customized location feature sets for applying to trained location quality prediction models where the feature sets include hybrid features combining aspects of two or more items of the location feature data into a single hybrid feature and the geographic regions are sized to a predetermined granularity level. Each feature set associated with a geographic region can be applied to a machine learning data model trained to predict rental property income at the respective predefined region from the customized location feature sets. Using the output data from the machine learning data model, the system can calculate location metrics quantifying a rental property income and the location quality for the geographic region.

21 Claims, 12 Drawing Sheets

(56) References Cited

U.S. PATENT DOCUMENTS

| | | | |
|---|---|---|---|
| 2012/0323798 A1* | 12/2012 | Den Herder | G06Q 50/16 705/306 |
| 2012/0330719 A1* | 12/2012 | Malaviya | G06Q 10/0635 705/7.31 |
| 2014/0143158 A1* | 5/2014 | Wilson | G06Q 30/0645 705/306 |
| 2014/0257924 A1* | 9/2014 | Xie | G06Q 30/0202 705/7.31 |
| 2015/0228037 A1* | 8/2015 | Wu | G06Q 50/16 705/313 |
| 2016/0027069 A1* | 1/2016 | Treadwell | G06Q 30/0278 705/306 |
| 2017/0006135 A1* | 1/2017 | Siebel | G06Q 10/06 |
| 2018/0330390 A1* | 11/2018 | Malaviya | G06Q 30/0202 |
| 2020/0013127 A1* | 1/2020 | Gozes | G06Q 50/165 |
| 2020/0211131 A1* | 7/2020 | Pangerl | G06Q 30/0645 |

OTHER PUBLICATIONS

Shokoohyar, S., Sobhani, A., & Sobhani, A. (2020). Determinants of rental strategy: Short-term vs long-term rental strategy. International Journal of Contemporary Hospitality Management, 32(12), 3873-3894. doi:http://dx.doi.org/10.1108/IJCHM-03-2020-0185 (Year: 2020).*

Qian, F. Z. (2021). Essays in the economics of housing and labor markets (Order No. 28688428). Available from ProQuest Dissertations and Theses Professional. (2610019462). (Year: 2021).*

Lundberg et al., A Unified Approach to Interpreting Model Predictions, 31st Conference on Neural Information Processing Systems (NIPS 2017), Long Beach, CA, pp. 1-10.

Glaeser et al., "Nowcasting Gentrification: Using Yelp Data to Quantify Neighborhood Change", Harvard Business School, Working Paper 18-077, 2018, pp. 1-11.

Chen et al., "XGBoost: A Scalable Tree Boosting System", KDD '16 Proceedings of the 22nd ACM SIGKDD International Conference on Knowledge Discovery and Data Mining, Aug. 2016, pp. 785-794.

Gower, J.C., "A General Coefficient of Similarity and Some of Its Properties", Biometrics, vol. 27, No. 4, Dec. 1971, pp. 857-871.

Ciesin: US Demography, Detailed History, Uses, and Availability of REIS Data, http://www.ciesin.org/datasets/reis/ext.reis.intro.html, 2 pages.

Gerace, Melissa, Remine Support Center, Moody's Analytics, Feb. 12, 2020, https://support.remine.com/hc/en-us/articles/360039738871-Moody-s-Analytics, 7 pages.

Lundberg, Scott M. and Lee, Su-In, "A Unified Approach to Interpreting Model Predictions," 31st Conference on Neural Information Processing Systems (NIPS 2017). 10 pages.

* cited by examiner

| variable | | importance |
|---|---|---|
| Distance to Metro | 706 | 3.688 |
| HH Income Median | 708 | 0.965 |
| Renter Owner Ratio | 710 | 0.430 |
| Empl. Ratio by Occ. -- Prod. & Trans. | 712 | 0.429 |
| Population Density / Mi^2 | 714 | 0.408 |
| Vantage Score Average | 716 | 0.387 |
| Building Permit Ratio (County) | 718 | 0.363 |
| Distance to US HWY | 720 | 0.314 |
| Empl. Ratio by Occ. -- Management | 722 | 0.288 |
| Public Commute Ratio | 724 | 0.286 |
| Advanced Degree (BA & Plus) Ratio | 726 | 0.260 |
| Proximity to Economic Opportunities | 728 | 0.241 |
| Distance to College | 730 | 0.239 |
| Distance to Interstate HWY | 732 | 0.234 |
| Above 150% Poverty Ratio | 734 | 0.198 |
| Empl. Ratio by Ind. -- IT & Finance | 736 | 0.187 |
| Public Worker Ratio | 738 | 0.172 |
| Rental Units Ratio | 740 | 0.169 |
| Work Hrs Mean | 742 | 0.168 |
| Empl. Ratio by Occ. -- Natural Const. | 744 | 0.159 |
| Empl. Ratio by Occ. -- Service | 746 | 0.145 |
| Employment Ratio | 748 | 0.142 |
| Empl. Ratio by Occ. -- Sales | 750 | 0.131 |

FIG. 7

| Features 802 | shap raw 806 | feature score 804 |
|---|---|---|
| HH Income Median | -0.0087 | -0.30 |
| Proximity to Economic Opportunities | -0.1076 | -3.71 |
| Distance to Metro | -0.0321 | -1.11 |
| Employment Ratio | -0.0004 | -0.02 |
| Population Density / Mi^2 | 0.0165 | 0.57 |
| Advanced Degree (BA & Plus) Ratio | 0.0193 | 0.66 |
| Distance to College | 0.0277 | 0.96 |
| Distance to US HWY | -0.0309 | -1.06 |
| Building Permit Ratio (County) | -0.0408 | -1.4 |
| Distance to Interstate HWY | -0.0206 | -0.71 |
| Above 150% Poverty Ratio | 0.0100 | 0.35 |
| Empl. Ratio by Ind. -- IT & Finance | -0.0229 | -0.79 |
| Empl. Ratio by Occ. -- Management | -0.0071 | -0.25 |
| Empl. Ratio by Occ. -- Service | -0.0026 | -0.09 |
| Empl. Ratio by Occ. -- Natural Const. | 0.0114 | 0.39 |
| Empl. Ratio by Occ. -- Sales | 0.0134 | 0.46 |
| Empl. Ratio by Occ. -- Prod. & Trans | -0.0206 | -0.71 |
| Rental Units Ratio | 0.0162 | 0.56 |
| Renter Owner Ratio | -0.0460 | -1.59 |
| Public Commute Ratio | -0.0253 | -0.87 |
| Work Hrs Mean | -0.0289 | -0.99 |
| Public Worker Ratio | -0.0273 | -0.94 |
| Vantage Score Average | -0.1034 | -3.57 |

SYSTEMS AND METHODS OF GENERATING FEATURE SETS FOR ENTITY EVALUATION

RELATED APPLICATIONS

This application is related to the following patent application: U.S. patent application Ser. No. 17/085,486, entitled "Systems and Methods of Generating and Transforming Data Sets for Entity Comparison," filed Oct. 30, 2020. The above identified application is hereby incorporated by reference in its entirety.

SUMMARY OF ILLUSTRATIVE EMBODIMENTS

In an illustrative embodiment, an automated entity evaluation system is configured to determine rental income and location quality for geographic regions using customized data sets. The system can generate, customized location feature sets for applying to trained location quality prediction models where the feature sets include hybrid features combining aspects of two or more items of the received location feature data into a single hybrid feature and the geographic regions are sized to a predetermined granularity level. Each feature set associated with a geographic region can be applied to a machine learning data model trained to predict rental property income at the respective predefined region from the plurality of customized location feature sets. Using the output data from the machine learning data model, the system can calculate location metrics quantifying a rental property income and the location quality for the geographic region, which can be output to an external device.

The systems and methods described herein address a number of problems and unfulfilled needs in the commercial real estate industry. Conventional methods of assessing multifamily rental income and location quality require massive human labor in manually searching information and potential properties. Manual searches lead to inconsistent comp selection results due to heterogeneous human experience, skills, and judgment. When real estate market participants do not have a full, unbiased view of the market, they suffer exposure to risk, and thus loss, due to poor property performance. The inventors have recognized that there is no existing tool to capture rental income values on granular levels (e.g., census tract level) that provide information to illuminate variations in rental income across a metropolitan statistical area (MSA) or other market level. Further, there have been no tools that provide fully automated, real time assessments of real estate quality assessments at multiple levels of granularity. The identified variations in location qualities by assessing location quality on a small-scale granular level can be used to make business decisions (such as pricing and securitization) at a more granular geographic level, so to better control for the various risks across sub-areas within a certain area. Additionally, with additional variation in location quality scores offered by census tract level analysis, real estate investors, loan generators, and other users can identify Targeted Affordable Housing (TAH) properties located in areas with higher location quality (meaning higher economic and social opportunities), so as to improve social mobility.

In addition, the conventional market analysis tools often cover areas within MSAs. For areas outside of MSAs, there is limited, or no, information to measure the location quality. The implementations described herein expand the market analysis coverage from MSAs to provide a nationwide analysis. This geographic coverage expansion enables business users to perform location analysis for areas that are usually not covered by the existing market analysis. Other problems solved by the implementations described herein include massive human labor costs in manually searching for information related to rental income and location analysis and inconsistent rental income and location analysis due to heterogeneous human experience, skills, and judgment that go into making manual location quality assessments.

The implementations described herein provide a significantly improved rental income analysis of multifamily properties for several reasons. First the systems and methods described herein extract and generate rental income drivers at a very fine level of geographic granularity (can be as fine as census tract level). This granularity provides variation in the rental income drivers among locations in close proximity to one another. Second, the implementations of the present disclosure provide rental income drivers, measure location qualities, and perform rental income predictions for almost all areas nationwide. This significantly increases the area coverage of rental income and location analysis since existing solutions only cover areas within MSAs. Third, the present disclosure provides information regarding geographic rental income drivers via one or more hybrid variables in an automated fashion (such as proximity to transportation, employment center, and recreational amenities) consistently across the nation, which is unavailable in conventional systems.

Further, conventional practice in rental income analysis is relies heavily on human judgment and evaluation based on limited information, that either lacks variation within a market or is compiled manually. The present disclosure improves the existing practice by improving speed of execution due to use of computing-based techniques that are rooted in computing technology (e.g., customized feature set generation for training and apply to customized machine learning data models) and do not rely on the human mind, which is fundamentally different process than what the human brain performs when executing location quality assessments. The present implementations also improve the quality of location quality evaluations because the evaluations are grounded in the analysis and processing of large amounts of data beyond which the human brain can handle and can take into consideration a more comprehensive set of criteria when making predictions and performing analyses. In addition, the analyses can be performed at a higher precision level because 1) the location features are generated at a very fine level of geographic granularity; and 2) the location features are provided across the nation, meaning that the location analysis can be expanded to areas outside of MSAs.

The technical advantages achieved by the present disclosure include the use of advanced techniques to extract and generate customized hybrid location features (such as proximity to transportation, employment center, and recreational amenities) that are not consistently provided by any existing tools. Additionally, the systems and methods described herein use advanced, customized, analytical machine learning algorithms to model connection between an area's average rental income and location features/qualities. This introduces objectivity and transparency to the rental income and location analysis, which results in consistent and high-quality results.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 7 illustrates a feature and importance table for a location evaluation platform;

FIG. 8 illustrates a feature level score table for a location evaluation platform;

DETAILED DESCRIPTION OF ILLUSTRATIVE EMBODIMENTS

Figure 1:
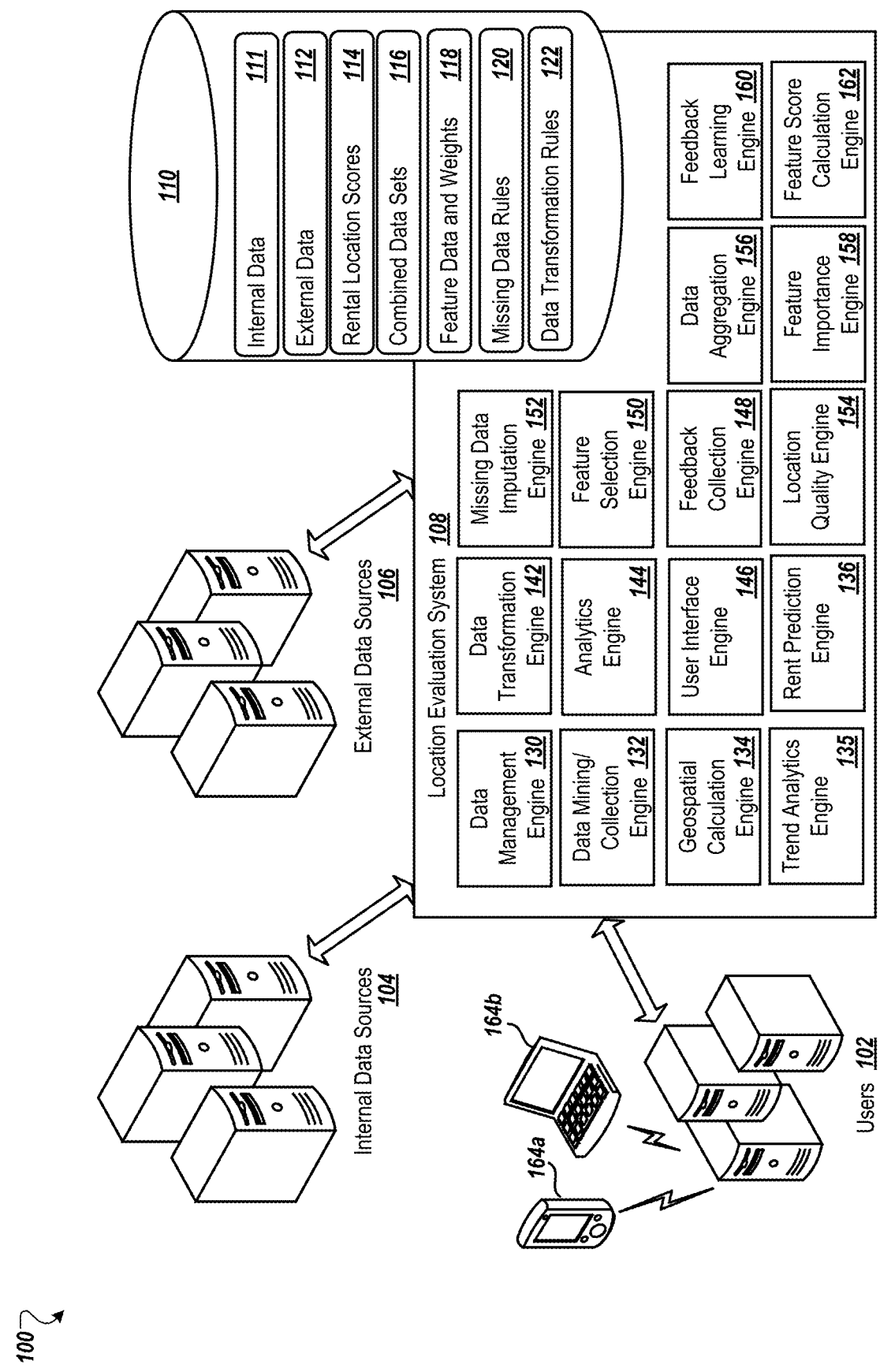
FIG. 1 is a block diagram of an example environment for a location evaluation system.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Aspects of the present disclosure are directed to systems and methods for generating feature sets for evaluating real estate entities. In some examples, one or more computing systems are configured to generate rental income predictions for multifamily real estate properties at multiple granularity levels. In some examples, rental income for a multifamily property is an indicator of the overall quality of the location. In addition, by training customized machine learning models, the systems can evaluate location features and qualities that drive rental incomes of real estate entities including multifamily buildings (e.g., apartment buildings) in a way not available in previously implemented conventional solutions. In such manual, conventional systems, human analysts underwrite real estate properties in a geographic area by qualitatively evaluating the strength and/or weakness of various location features. These manual, conventional implementations are subject to computation inefficiencies, human bias, and errors. In addition, the conventional systems may only have access to qualitative real estate surveys that may have missing information, errors, or biases.

The implementations described herein provide a technical solution to the technical problem of providing unbiased, computationally efficient method for producing real-time rental income predictions at granularity levels not previously available in rental evaluation markets. For example, the systems can generate rental income predictions at a census tract level, which is much smaller than other conventional location areas. In some examples, a census tract corresponds to a geographic region encompassing a population of approximately between 2,500 and 7,500 people. Also, the present implementations go beyond the mere qualitative evaluations produced by manual methods by quantifying the location quality as well as the impacts of each feature on the overall location quality. Furthermore, the embodiments described herein, both the predicted rental income and the location quality score, can provide guidance for originators/underwriters in identifying the multifamily properties with growth potential in upward trending areas, which might create opportunities (such as helping the development of multifamily properties) for some under-served areas. While the implementations described herein refer to multifamily property location quality assessments, it can be understood that the teachings described herein can also be applied to single family homes or other types of commercial real estate.

FIG. 1 is a block diagram of an example environment 100 for a location evaluation system 108. The diagram illustrates relationships, interactions, computing devices, processing modules, and storage entities used to gather, generate, organize, store, and distribute the information necessary to automatically, accurately, and efficiently generate nationwide location quality statistics in real-time at multiple granularity levels. In some implementations, users 102 interact with the location evaluation system 108 via an application hosted on an external device 164, such as a laptop 164b, mobile device 164a, or tablet. Users can include loan purchasers, providers, underwriters, and/or prospective property purchasers.

The location evaluation system 108, in some implementations, is configured to rapidly ingest data from multiple internal data sources 104 and external data sources 106 by data mining and collection engine 132, identify statistically significant driving variables and transformations by a feature selection engine 150 and data transformation engine 142, and train and fine tune a machine learning algorithm by an analytics engine 144 to identify a set of final variables for analysis. In some implementations, the location evaluation system 108 can be configured to communicate with internal data sources 104 and external data sources 106 via a network (e.g., network 1128 in FIG. 11). The system 108, via rent prediction engine 136, location quality engine 154, feature importance engine 158, feature score calculation engine 162, and/or trend analytics engine 135, is further configured, using the trained machine learning algorithm, to calculate rental property income predictions, determine location quality scores that allow users to more quickly and accurately identify a current status of a multifamily rental market in real-time at multiple granularity levels not discernable through conventional techniques. For example, the system 108 can generate real-time location quality predictions for a census-tract level, zip code level, county level, and/or metropolitan statistical area (MSA) level. Prior to the development of the implementations described herein, even manual rental income predictions were not available at the census tract level, which provides users with improved rental predictions due to the reduced size of the tract compared to the other granularity levels. The improvements achieved by the techniques described herein are due to the customized feature sets of training variables and input variables that machine learning models trained for each granularity level use to determine rental income predictions and identify how much each feature contributes to the prediction. Further, granularity levels larger than the census tract level are not able to capture the variability in location quality that exists across those larger areas (e.g., zip code level and larger). In addition, because the rental income predictions are calculated for individual census tracts, the system 108 is also able to provide rental income predictions on a nationwide scale, while other conventional systems are only able to make rental income predictions for locations that fall within a MSA.

In some embodiments, external data sources 106 that provide external data 112 to the system 108 can include a wide variety of sources such as census data, tax (IRS) data, third-party multifamily data vendors, and other open data sources. Table 1 below shows examples of types of data sources (e.g., external data sources 106) that provide external data 112 to the system 108. Table 1 also provides details regarding the granularity of each of the types of external data 112 and the frequency of data updates. In some implementations, data obtained from external data sources 106 can be used to create hybrid features that enhance the accuracy of the rental income and location quality analysis when compared to systems that just use traditional data features in their location quality analysis. In some examples, the location evaluation system 108 creates hybrid variables by combining multiple data types (e.g., geographic and economic data) into one or more individual variables to better capture and quantify the drivers of multifamily rental income. For example, distances from a property location to highways, metros, universities, or businesses may significantly impact multifamily rental income and therefore location quality. In some examples, certain types of data may be used for data modeling and others may be used in user interface generation. Data mining/collection engine 132, in some examples, can extract external data 112 from each of the data sources at an update frequency (e.g., the update frequency listed in TABLE 1). In other examples, one or more of the external data sources 106 can be configured to automatically provide requested data to the system 108 at the predetermined frequency. The external data sources 106 and types of external data 112 described herein are exemplary and are not meant to include an exclusive or exhaustive list of types of external data sources 106 that can provide data to the location evaluation system 108.

TABLE 1

| Data Source | Description | Information Used In Modeling and/or User Interface | Granularity Level | Update Frequency |
| --- | --- | --- | --- | --- |
| Census | Demographic data provided by the American Community Survey | Population; Income; Education level; Labor force participation | Census Tract | Annually |
| Trepp | Property Rental Income | Effective Gross Income (EGI) | Address | Annually |
| BEA | MSA level GDP | GDP | MSA | Annually |
| CBP/ZBP | Business pattern at county level/zip code level | Number of food services; number of financial and insurance, etc. | County/Zip | Bi-annually |
| Geospatial Data (Highways, Metro, Colleges) | US Highways and interstates, US metro stations, US colleges | Distance to highways, metros, colleges | Exact Lat/Long | N/A |
| Other Open Data Sources | Specific to multifamily properties and local information services | Local neighborhood and property features | Exact Lat/Long | Annually |
| Credit Bureau Data | Zip Code Level Credit Score | Zip Code Level Credit Score | Zip | Quarterly |

In some embodiments, the location evaluation system 108 can include one or more processing engines or modules 130, 132, 134, 135, 136, 142, 144, 146, 148, 150, 152, 154, 156, 158, 160, 162 executed as software programs on hardware computing systems. References to the engines or modules throughout the disclosure are meant to refer to software processes executed by circuitry of one or more processing circuits, which can also be referred to interchangeably as processing circuitry. In some implementations, the processes associated with the location evaluation system 108 can be performed by one or more servers having one or more processing circuits such that some processes or portions of processes may be performed on different servers.

In one example, the location evaluation system 108 includes a data management engine 130 that organizes the data received by the system 108 from the users 102, internal data sources 104, and external data sources 106 and controls data handling during execution of the processes described further herein. The data management engine 130, in some embodiments, also controls the interaction of the location evaluation system 108 with at least one data repository 110 associated with the environment 100. For example, the data management engine 130 controls the storing and accessing of both system-generated data and system-received data as well as the interactions between system-generated and system-received data. For example, the data management engine 130 accesses internal data 111 and external data 112 from data repository 110 and provides the internal and external data 111, 112 to missing data engine 152, feature selection engine 150, analytics engine 144, rent prediction engine 136, and/or location quality engine 154. Further, the data management engine 130 receives feature data and weights 118 from analytics engine 144 and feature selection engine 150, which it stores in the data repository 110. In some embodiments, the data management engine 130 controls the flow of data between the data repository 110 and the location evaluation system 108.

In some embodiments, the location evaluation system 108 includes a feature selection engine 150 that applies data processing techniques to generate customized data structures for applying to machine learning data models that generate outputs used to calculate location quality scores. These data processing techniques employed by feature selection engine 150 and data transformation engine 142 can also include improving on original data through a process of filling in missing features. In some implementations, feature selection engine 150 selects features to be used for feature analysis and machine learning by performing one or feature selection and population filtering processes. For example, the feature selection engine 150 can examine the missing rate for each possible data feature and drop any features that are missing from data sets (including both internal data 111 and external data 112) and drop any features with an absence rate of greater than a predetermined percentage (e.g., 50%). Additionally, features with less than a predetermined percentage of variation (e.g., 10%) may also be dropped from the feature sets.

In some examples, location evaluation system 108 can also include a data transformation engine 142 that transforms data from internal data sources 111 and external data sources 112 into compatible formats for processing. In some examples, this can include applying customized data transformation rules 122 that may incorporate exploratory data analysis (EDA), outlier analysis, and/or correlation analysis to consolidate and normalize data features into customized feature sets. Additionally, feature selection engine 150 can perform data transformation processes that allow the system 108 to capture relationships between location features and location quality. In some examples, types of data transformations include creation of new features from features in original data sources, such as hybrid features that combine multiple categories of information into individual feature variables that can be predictors of rental income. For example, proximity of a census tract to an economic center or other economic opportunities is one such hybrid variable. In some implementations, data transformation engine 142 generates the hybrid features in conjunction with geospatial calculation engine 134, which calculates distances from properties or census tracts to geospatial features associated with each of the hybrid variables (e.g., distance to metro stations, highways, universities, or economic centers).

Data aggregation engine 156, in some examples, combines the hybrid variables with other data features from internal data sources 111 and external data sources 112 to create combined data sets 116, which are stored in data repository 110. In some examples, the combined data sets 116 can include a modeling data set and a location score calculation data set. In some implementations, for the modeling data set, each observation includes both input variables and a corresponding output variable. The output variable, in some examples, is the rental income per unit per month (log scale), and the input variables include features for a particular location. In some implementations, multiple levels of information for the input variables and output variables enable various modeling granularity levels. For example, when a tract-level modeling sample is generated, the output variable is the rental income per unit per month of a property, and the input variables are location features at the finest level that can be extracted/generated. In one example, most location features may be available at the census tract level, one or more features (e.g., transit related features) are available at the property level, and one or more features (e.g., building permit) are available at a county level. When a modeling data set is created for geographic levels larger than the census tract level, data aggregation engine 156 aggregates information for each variable at the respective geographic level. In some implementations, the location score calculation data set represents all geographic locations nationwide in which each observation in the data set includes a data structure of features associated with a respective location. In some examples, the data structure of location features is the same as those location features in the modeling data set.

In some examples, the system 108 can include a missing data imputation engine 152 that is configured to derive missing features in the combined data sets 116 that may occur due to information gaps in the internal data sources 111 and/or external data sources 112. In some examples, property features may be missing due to lack of information in census surveys or due to there being an insufficient number of multifamily properties within a given census tract. Where there are no multifamily properties in a census tract, the distance-based hybrid feature variables are missing (e.g., distances to metro, highway, universities). To mitigate the missing features, missing data imputation engine 152 can fill in the missing features using one or more imputation technique. In some examples, missing data can be imputed with neighbor census tract information by leveraging geospatial techniques to detect neighboring census tracts and then use the median of its neighbors to impute the missing feature values. In some implementations where a census tract lacks multifamily properties, the center of the census tract may be used to calculate the distance to transportation and amenities. For distance-based variables where a given feature does not exist within a predetermined region (e.g., no metro within a given MSA associated with the census tract), the missing data imputation engine 152 may assume that the distance to the respective feature is infinity such that the correspondence distance variable is set to zero (inverse of true distance).

In some implementations, the location evaluation system 108 includes an analytics engine 144 that is configured to train machine learning data models at each granularity level to generate rental income predictions and feature-level scores indicating how much each feature in the combined data sets 116 contributes to the rental income prediction and location quality score for multifamily properties. The multifamily rental location score models leverage information within customized combined data sets 116, including the customized hybrid variables, to measure the location quality strength in terms of rental income. In some examples, a higher score indicates a higher rental income in that location. In some implementations, an Extreme Gradient Boosting (XGBoost) model is trained using the input/output variables from the modeling data set for each granularity level. In some examples, modeling data set is applied to the trained data models measure the relationship between the rental income and the location features. The fully trained model is then applied on nationwide location data using location score calculation data set to calculate the location scores for each granularity level across the nation. In addition, the trained model determines Shapley values for each feature, which is used to calculate feature level scores.

In some embodiments, the analytics engine 144 trains and employs XGBoost models for rental income prediction, location score calculation, and feature importance calculations. XGBoost models can include an optimized distributed gradient boosting library designed to be highly efficient, flexible, and portable. Boosting is a sequential process, where each subsequent model attempts to correct errors of the previous model such that each successive model is dependent on the previous model. The XGBoost model combines a number of weak learners to form a strong learner through weightings. Feature importance for each feature in the customized combined data sets is calculated using a "weight" method, that is, the percentage relative to all other variables that a given variable is used to split data across all trees.

FIG. 7 shows a table of a machine learning model output 700 that includes relative importance values 702 in ranked order for each feature variable 706-750 in the combined feature set 116 that contribute to the rental location score for the respective location (census tract). The model results show that the location features with the highest importance scores are distance to metro 706 and median household income 708, which aligns with the proposition that a property located close to metros or located in places with higher household income tends to generate a stronger rental income. In this example, the model results 700 also show that demographic information like percentage of residence have bachelor's degree or higher 726 and population density 714 contribute to the level of rental income. In addition, customized geospatial hybrid variables like distance to highway 732 and distance to college 732 also impact rental income. In some examples, each feature and its respective importance value are stored in data repository 110 as feature data and weights 118.

Returning to FIG. 1, in some examples, the XGBoost models output location scores for each census tract in the nationwide location score calculation data set, which are indicative of rental income strength for each location at each granularity level. Table 2 below shows five examples of score results at the census tract level. In Table 2, the first column GEOID represents the unique identifier of each census tract. The second column is the raw predicted value from the XGBoost model, which is the predicted annual revenue per unit at log scale. The last column is the final location score, which is calculated by applying a linear transformation of the raw score according to the following equation:

$$\text{location score} = \frac{\text{location score raw} - \text{min score}}{\text{max score} - \text{min score}} * 100$$

In this example, the nationwide minimum score is fixed at 7.9 and the maximum score as 10.8. Since the location score is time dependent, in some implementations, fixing the minimum and maximum scores makes the score comparable across multiple years. At the same time, some locations may have scores larger than 100 (indicating a very high rental location quality) or less than 0 (indicating a very low rental location quality).

| GEOID | location_score_raw | location_score |
|---|---|---|
| 1001020100 | 8.99 | 37.48 |
| 1001020200 | 8.98 | 37.09 |
| 1001020300 | 8.92 | 35.31 |
| 1001020400 | 9.07 | 40.34 |
| 1001020500 | 9.02 | 38.62 |

The analytics engine 144 can also use a Shapley Additive Explanations (SHAP) algorithm to explain the outputs of the trained machine learning data models. The SHAP algorithm is an approach to explaining the output of the trained machine learning data models that connects optimal credit allocation with local explanations using Shapley values from game theory and their related extensions. In some examples, to supplement the outputs of the machine learning data model, the SHAP algorithm provides insight into why each census tract or other geographic area (zip code, county, MSA) receives a particular location quality score. For example, the Shapley value quantifies the contribution that each feature brings to the prediction made by the model. For each observation and each feature, the Shapley value shows the contribution of that feature to push the model output from a base value (the average model output over the training dataset) to the model output. In an example, suppose we have F features, the formula for calculating the Shapley value is given by the following equation:

$$SHAP_{feature}(x) = \sum_{set:feature \in set} \left[ |set| \times \binom{F}{|set|} \right]^{-1} \left[ \text{Predict}_{set}(x) - \text{Predict}_{set \setminus feature}(x) \right]$$

In some examples, the SHAP algorithm uses the following two inputs to calculate Shapley values: the trained machine learning data models and the location score calculation data set.

FIG. 8 shows a table 800 of feature scores 804 and corresponding Shapley values 806 for each feature 802 applied to the trained machine learning data model. The second column is the raw Shapley value 806 derived directly from the SHAP algorithm. Since the raw Shapley values may be difficult for users 102 to grasp conceptually, a linear transformation can be performed on the raw Shapley value to generate a feature score 804 in the same scale as the location score. In one example, an equation for converting Shapley value 806 to feature score 804 is as follows:

$$\text{feature score} = \frac{shap \text{ raw}}{\text{max score} - \text{min score}} * 100$$

For example, for the median household income variable 808, a feature score of −0.30 means for this selected census tract, this feature pulls down the location score by −0.30 from the national average. In some embodiments, the feature score 804 measures a direction and magnitude of each feature to pull up or pull down the final location score for the respective census tract.

Returning to FIG. 1, the location evaluation system 108 can include one or more processing engines that are configured to manage, process, and configure the outputs generated by the analytics engine 144 via the trained machine learning data models, which can be stored in data repository 110 as rental location scores 114. For example, rent prediction engine 136 is configured to manage the rental prediction output from the trained machine learning data models and transform the rental income per unit per month from log scale to linear scale. Location quality engine 154, in some examples, is configured to transform the raw rental income score to a location quality score as discussed above. In some examples, the location quality score can be based on a nationwide scale. For all locations nationwide, in some examples, location quality engine 154 can map or normalize predicted rental incomes (per unit per month) to a customized nationwide scale. In one example, the customized scale may be from 0 to 100. In some examples, higher scores may indicate that a respective geographic location area has a better location quality driving a high rental income. Feature score calculation engine 162, in some examples, can be configured to calculate feature scores from the Shapley values for each feature that contributes to the location quality score as discussed above.

Feature importance engine 158, in some implementations, is configured to receive and process the feature importance values output by the analytics engine 144 that quantify the contribution of each feature to the rental income score and/or location quality score as discussed above. In some implementations, feature importance engine 158 can also be configured to calculate bucket-level importance ratios for groups of features in geographic areas at each granularity level. In some implementations, location features can be grouped into bucket categories which include two or more of economics (features 708 (median household income), 716 (average credit or Vantage score) in FIG. 7), demographics (features 714 (population density), 724 (public commute ratio), 726 (percentage of residents with bachelor's degree and above), 734 (% of workers at >150% poverty level) in FIG. 7), transit (features 706 (distance to metro), 720 (distance to highway), 728 (proximity to economic opportunities), 730 (distance to college), 732 (distance to highways) in FIG. 7), labor market (features 712, 722, 736, 744, 746, 750 (employment ratio by occupation or industry), 738 (public worker ratio), 742 (mean work hours among residents), 748 (employment ratio) in FIG. 7), and rental market (features 710 (renter owner ratio), 718 (building permit ratio), 740 (rental units ratio) in FIG. 7). For each bucket, the bucket-level importance is the sum of feature-level importance values, across all features belonging to the respective bucket. In one example, feature-level importance is distinct from the feature-level score and corresponds to the absolute value of the feature-level Shapley value. The feature-level importance, in some examples, measures the importance of one feature through the trained machine learning model and all the considered location features. In some aspects, the bucket-level importance ratio is calculated as follows:

$$\frac{\text{Bucket - level importance}}{\sum_{all\ buckets} \text{Bucket - level importance}}$$

In some implementations, trend analytics engine 135 can be configured to perform trend analysis for location quality scores, feature importance scores, and/or feature/Shapley scores. For the location quality score, users can find out the trended location score for previous years, by clicking "trend" button 520 on user interface screen 500 (FIG. 5) next to the displayed most up-to-date location score. With such trend information, users can have a retrospective view of previous results and can identify any upward or downward trends of rental income in the areas of interest. In addition, for each feature, users can find out the raw feature-level values and feature-level scores for the previous years. In some examples, this trend information helps users to identify the drivers for the upward, or downward trends of location quality.

Figure 6:
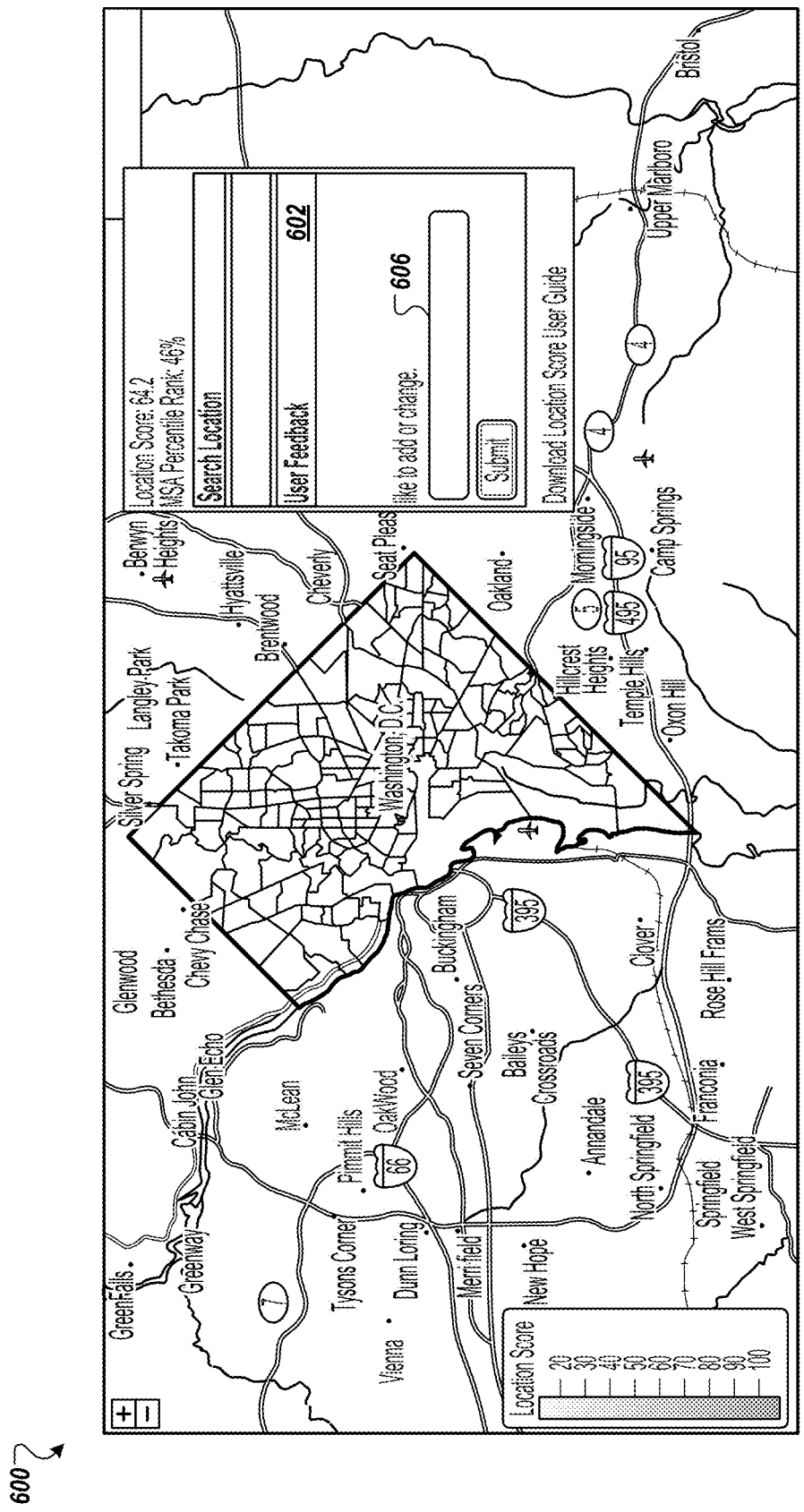

In some embodiments, feedback collection engine 162 collects real-time user actions through a feedback UI screen (e.g., UI screen 600 in FIG. 6). At the UI screen, in some examples, a chat input box is provided (input box 606 in FIG. 6) to encourage users 102 to leave comments indicating-anything they would like add, remove, or change from the system 108 and corresponding user interface screens, and why. Users 102 can also provide input regarding whether the results generated by the system 108 are as expected or appear to have inaccuracies. In some implementations, feedback learning engine 148 incorporates feedback learning that is used to further train and refine machine learning algorithms used by analytics engine 144 to provide more accurate results. In some examples, users 102 (e.g., underwriters, system backend administrators) provide feedback regarding the quality of system-calculated rental income scores and feature importance/bucket contributes, and this feedback is used to refine and/or retrain the machine learning data models.

Figure 4:
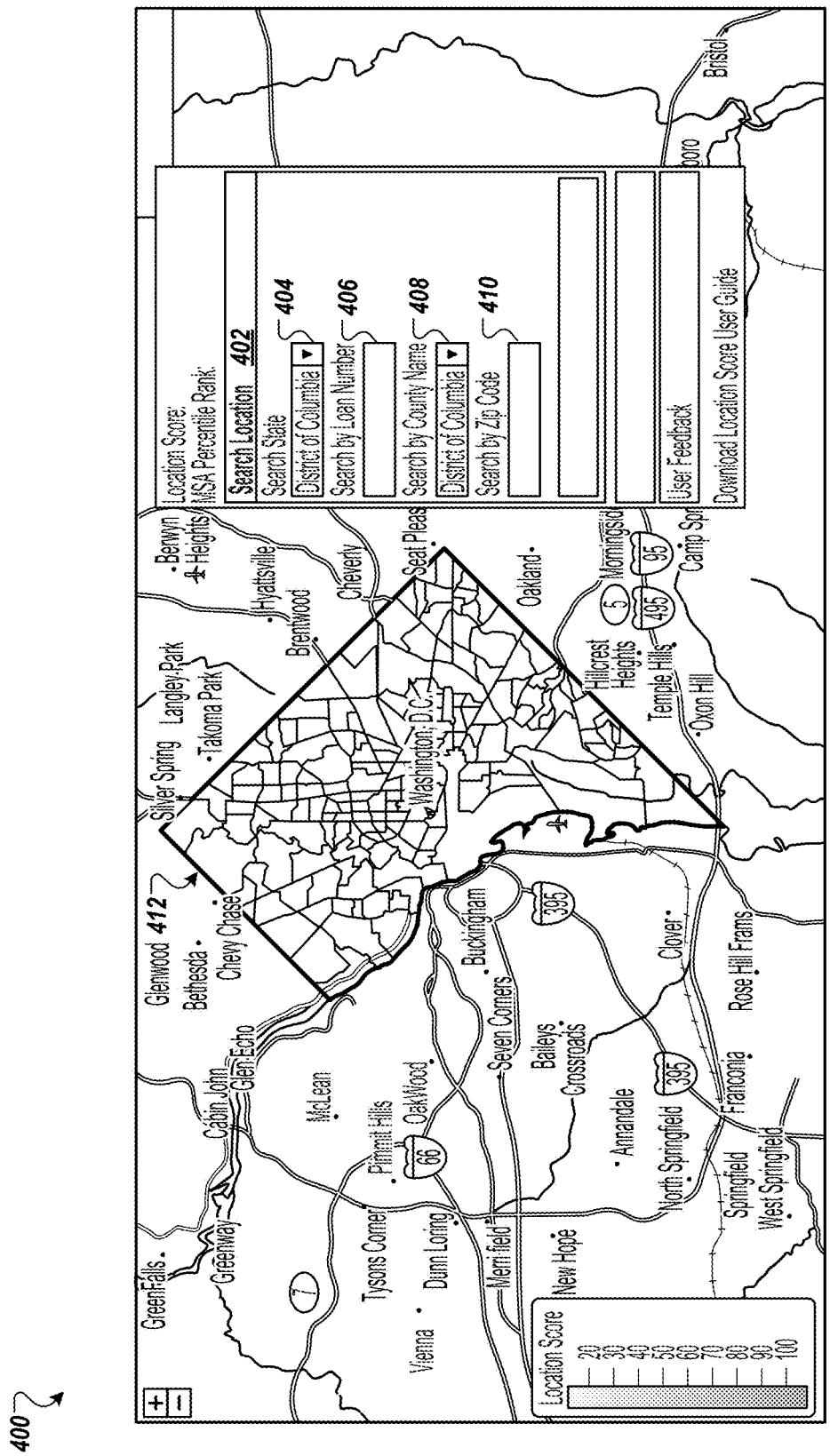
FIGS. 4-6 illustrate example location evaluation user interface screens.

In some implementations, the location evaluation system 108 can include a user interface engine 146 that generates, prepares, and presents user interface screens to users 102 in response to submitting a rental income query. In another implementation, the user interface engine 146 may be external to the location evaluation system 108 yet still communicate with the location evaluation system 108 via a network to receive data presented to a user at one or more user interface screens. FIG. 4 illustrates an example interactive map user interface screen 400 generated by user interface engine 146 that functions as a landing page for interacting with the system 108. The user interface (UI) screen 400 may display map-based geospatial features associated with a user rental income query. For example, the UI screen 400 may include a search input panel 402 that allows users 102 to search for rental income locations by state 404, loan number 406, county name 408, and/or zip code 410. In response to receiving search input criteria at one or more of the input fields 404, 406, 408, 410, in some implementations, user interface engine 146 displays, in real time, geospatial data for the queried location along with delineations of census tract boundaries within the queried MSA/queried region 412. For example, the UI screen 400 displays geospatial data and census tract boundaries for the queried state/county of Washington, DC.

Figure 5:
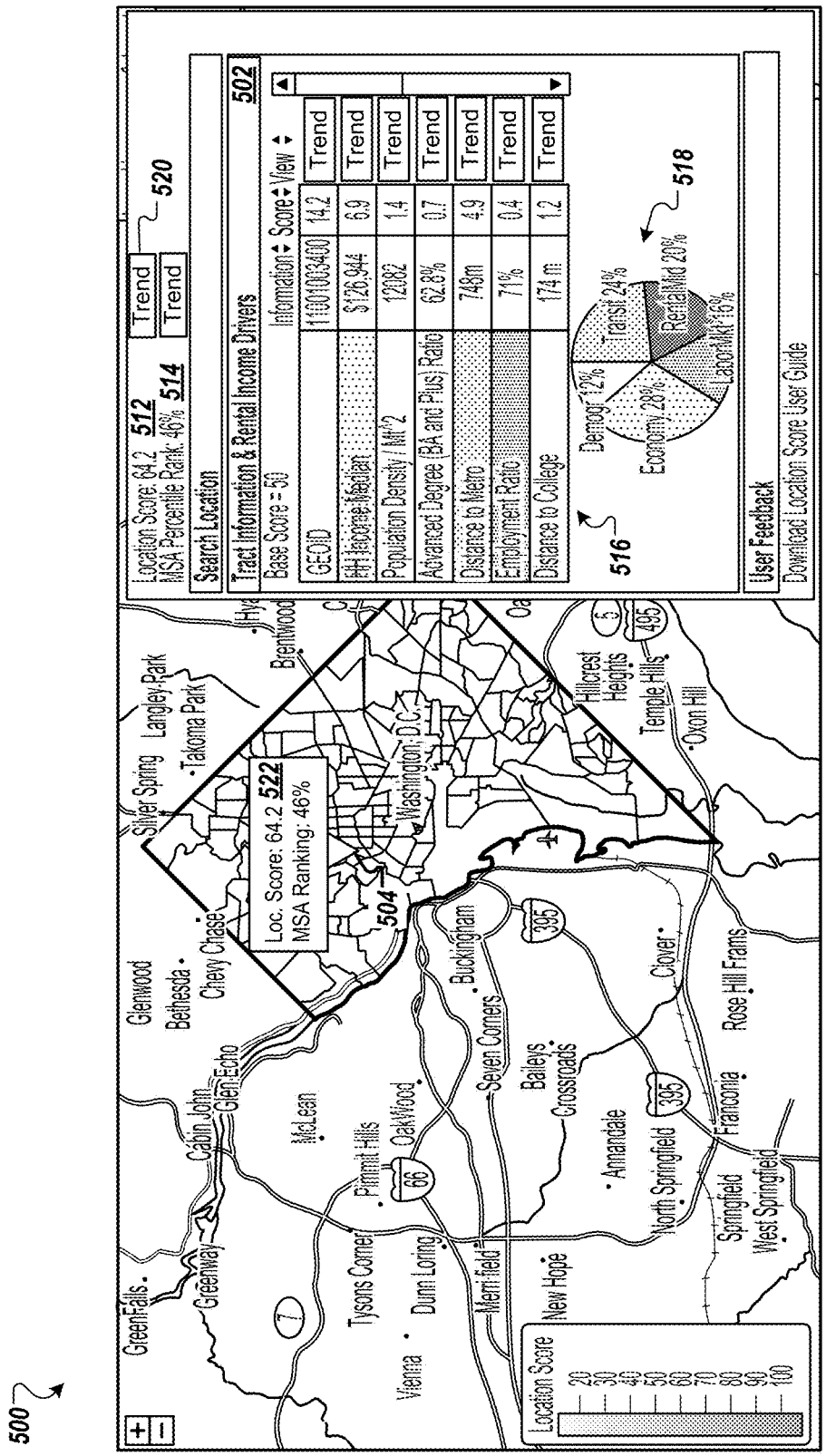

As shown in UI screen 500 illustrated in FIG. 5, in response to receiving a location quality query at search input panel 402, UI screen 500 can display a results panel 502 that shows tract information and rental income drivers in real time as determined by the trained machine learning algorithms. In one example, in response to receiving search information for census tract 504, results panel 502 displays a nationwide quality score 512, MSA percentile ranking 514, an information table 516 listing a raw value and feature-level location score for each location feature, and a pie chart 518 showing a bucket-level importance ratio for each bucket. In some examples, each bucket is displayed in its own respective color with all features belonging to the respective bucket being color-coded in the same color in the information table 516. In addition, for each location score 512, MSA percentile ranking 514, and feature score presented within feature table 516, a trend analysis input selector 520 allows users to view another UI screen that displays time-based trend for the selected result or feature. In addition, user interface engine 146 can be configured to automatically adjust the information displayed at information bubble 522 or results panel 502 in real-time as a user 102 moves an input cursor to another census tract displayed in UI screen 500. In this way, the UI screen 500 is dynamically updatable in response to user inputs and can give users a clearer picture of variation in location quality across an MSA or displayed geographic region. In some embodiments, instead of displaying location quality scores on a census tract level, the UI screen 500 may display results information for other granularity levels such as zip code, county, or MSA.

Turning to FIG. 6, a user feedback panel 602 on a results UI screen 600 is shown. At the UI screen 600, in some examples, chat input box 606 is provided to encourage users 102 to leave comments-anything they would like to add, remove, or change from the system 108 and/or feedback on the results generated by the system 108. Feedback collection engine 148 and feedback learning engine 160 collect and analyze the feedback comments and transform the received feedback into information that can be used in model/product refinement and improvement.

Figure 2:
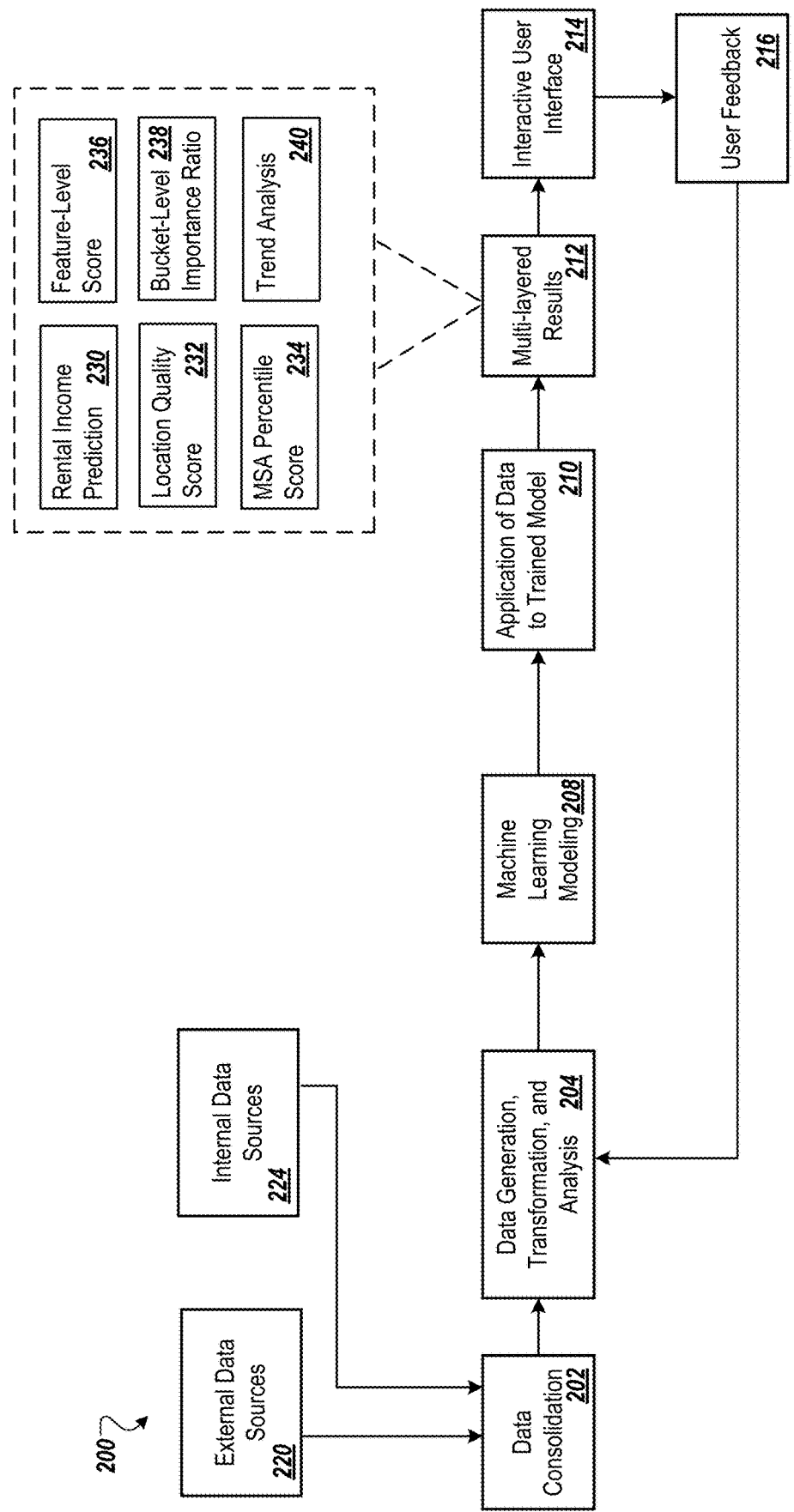
FIG. 2 illustrates a work flow diagram for an example rental modeling and evaluation process.

Turning to FIG. 2, a work flow diagram for an rental modeling and evaluation process 200 is illustrated. In some examples, the work flow diagram shown in FIG. 2 is a high-level view of the processes illustrated by the flow charts in FIGS. 9 and 10. In some implementations, the process 200 generates rental income predictions for different-sized location sections based on customized feature variable sets that provide quantitative representations of qualitative variables that impact rental income, which improves accuracy of rental income prediction assessments.

The process 200 can include a data consolidation stage 202 that relates location features to property-level data based on geospatial data received from external data sources 220. In some examples, data consolidation stage 202 extracts data about location features (e.g., economic and demographic information, as well as labor market and rental market information) and property-level rental income features from both internal data sources 224 and external data sources 220. For location features, data consolidation stage 202 extracts information from external data sources 220 such as census data, public economic data (e.g., Bureau of Economic Analysis (BEA)), business pattern data (CBP/ZBP), and/or credit reporting data from credit bureaus (see also Table 1 above). In addition, for transit-related information, stage 202 extracts related shape files and performs a nationwide geospatial computation to generate transit-related variables that impact rental income (e.g., distance to metro, distance to highways, distance to closest college or university). For property-level rental income data features, stage 202 extracts information from our internal portfolio data and external financial analytic (e.g., Trepp®) data.

At data generation, transformation, and analysis stage 204, feature sets of variables to be applied to a machine learning model are generated. In some examples, the variables include new, customized variables not present in the internal data sources 224 and external data sources 220. In addition, the newly generated variables are merged with variables from internal and external data sources 220, 224 to create complete feature sets. In addition, data generation, transformation, and analysis stage 204 performs data transformation and analysis (e.g., EDA, outlier analysis, and/or correlation analysis) on the consolidated data and newly generated feature variables.

In some implementations, stage 204 creates newly generated hybrid variables by combining different data types (e.g., geographic and economic data) into one or more individual variables to better capture and quantify the drivers of multifamily rental income. In one example, the hybrid variables include a "proximity_to_MSA_center" variable, which combines distance between a property to the MSA center and the economic size of the MSA into a single variable that can be a predictor of rental income. In addition, stage 204 can execute one or more methods to impute missing information received from external data sources 220 and/or internal data sources 224. In some examples, for missing census information and missing geospatial distance information, interpolation methods are applied to adjacent geographic areas to determine a respective missing feature variable. For example, a respective census tract may have missing information for variable "percent of people with Bachelor's degrees." In some embodiments, stage 204 uses geospatial calculation to identify tracts that are geographically adjacent to the respective tract uses an average or median value of the variable across these identified tracts as the imputed value for this tract.

In some examples, stage 204 also transforms feature data from one geographic granularity to another. For example, the credit information for individuals associated with multifamily rental properties is available at a zip code level but not the census-tract level. To transform across granularity levels, stage 204 uses a transformation file (e.g., Hud USPS Crosswalk file) to identify all zip codes that overlap with a given census tract and applies a residential-area ratio as a weighting factor to calculate a weighted average of zip-level credit scores from the identified overlapping zip codes.

By processing raw data and hybrid feature variables, data generation, transformation, and analysis stage 204 generates two types of datasets: a modeling data set and location score calculation data set. In some implementations, for the modeling data set, each observation includes both input variables and a corresponding output variable. The output variable, in some examples, is the rental income per unit per month (log scale), and the input variables include features for a particular location. In some implementations, multiple levels of information for the input variables and output variables enable various modeling granularity levels. For example, when a tract-level modeling sample is generated, the output variable is the rental income per unit per month of a property, and the input variables are location features at the finest level that can be extracted/generated. In one example, most location features may be available at the census tract level, one or more features (e.g., transit related features) are available at the property level, and one or more features (e.g., building permit) are available at a county level. When a modeling data set is created for geographic levels larger than the census tract level, stage 204 aggregates information for each variable at the respective geographic level. In some implementations, the location score calculation data set represents all geographic locations nationwide in which each observation in the data set includes a data structure of features associated with a respective location. In some examples, the data structure of location features in the score calculation data set is the same as the structure of those location features in the modeling data set.

In some implementations, machine learning modeling stage 208 trains a machine learning algorithm with the generated modeling data set. In some examples, the machine learning algorithm is a gradient boosting tree algorithm such as a Python XGBoost algorithm that can determine a prediction correlation between outcome variables and input variables in the modeling data set. The trained XGBoost model includes trained decision trees and a number of tuned hyperparameters (e.g., the number of trees used in total in the model). As discussed above, at stage 210, in some implementations, the location score calculation data set is applied to the trained machine learning data model, which outputs location rental income and quality scores as well as respective importance values indicating how much each input variable impacts the location rental income score.

The process 200, in some embodiments, also includes a multi-layered results stage 212 in which generates rental income prediction results from the output of the trained machine learning algorithm that can be displayed in real time at user interface screens to a user of the location evaluation system 100. In some examples, results stage 212 can generate the prediction results at each available granularity level (e.g., census tract, zip code, county, MSA).

In some examples, the rental income prediction results can include rental income prediction score 230, location quality score 232, MSA percentile score 234, feature-level score 236, bucket-level importance ratio 238, and/or trend analysis results 240. For the rental income prediction score 230, in some implementations, the trained machine learning data model is applied to the location score calculation data set, which outputs a rental income per unit per month (log scale) for each location granularity level (e.g., census tract, zip code, county, MSA). For example, a first model trained with census tract-level modeling sample is a tract-level model, and this tract-level model is applied on tract-level location score calculation dataset to generate rental income per unit per month (log scale) for all tracts across the nation. For each tract, in some embodiments, the predicted rental income may be an average rental income across properties in the respective census tract. The predicted rental income can be an indicator of location quality with respect to absolute rental income.

In some examples, the results generated at stage 212 can include a location quality score 232, which can be based on a nationwide scale. For all locations nationwide, in some examples, process stage 212 can map or normalize predicted rental incomes (per unit per month) to a customized nationwide scale. In one example, the customized scale may be from 0 to 100. In some examples, higher scores may indicate that a respective geographic location area has a better location quality driving a high rental income. The location quality score 232 provides an improvement over conventional location assessments because it can fully capture the breadth of rental income diversity over multiple granularity levels without relying on manual surveys of property managers that are unable to give a fulsome picture of the rental quality across multiple granularity levels of geographic regions. The process 200 can achieve these technical benefits based on its use of custom-generated feature sets that are used to train the machine learning model to predict rental income from the customized feature sets that include hybrid-variables capturing combinations of economic, geographic, and demographic features. In some examples, in addition to a nationwide location quality scale, processing stage 212 can also generate location quality scores for customized geographic regions. For example, processing stage 212 may produce location quality scores normalized specifically for coastal regions (west and/or east), inland/midwestern regions, southern regions, or northern regions of the United States.

The results generated at stage 212, in some examples, can also include an MSA percentile score 234, which indicates a relative percentile ranking of rental income score for each census tract compared to all other census tracts in the respective MSA. In one example, a census tract with location quality score of 75 that is the highest score within the MSA has an MSA percentile score 234 of 100%. In some examples, this percentile score can be applied to any user-defined area. For example, if a user indicates at a user interface screen that the user wishes to see all zip codes ranked within a county, processing stage 212 can generate a county percentile score for all zip codes within a county, using location scores derived from a trained zip code-level machine learning data model.

In some embodiments, processing stage 212 can calculate feature-level scores 236 for each location and each respective granularity level. In some implementations, the feature-level score 236 is calculated using feature-level Shapley value. In a data modeling context, area-level (e.g., tract-level) Shapley value measures a deviation from a base case to the respective area's model-predicted rental income. In some examples, the base case is defined as the average of model predictions across observations in the modeling data set. In one example, the average predicted rental income, across the modeling data set, is very close to a national average rent. Therefore, the modeling data set can be treated as a national representative data set, and the area-level Shapley value can be treated as a measurement of the deviation from the national average location quality to the respective area's location quality.

In some embodiments, for each area at each granularity level, the area-level Shapley value corresponds to a sum of feature-level Shapley values, across all features associated with an area. In some examples, feature-level Shapley value measures how each feature affects, or contributes to, the area's deviation from the national average location quality. To provide a consistent measurement with location quality score, in one example, processing stage 212 rescales feature-level Shapley values, using the same scale used by nationwide location quality score. The rescaled feature-level Shapley value can be named as feature-level score, which quantifies how much a location feature pushes up or pulls down the respective area-level location quality score from the national average. In addition, feature-level score can give a fully transparent view of how various features contribute to the location quality for a given geographic area. Currently, when a human analyst underwrites a neighborhood area, he considers various location features and evaluates the strength and/or weakness of each feature. The feature-level score as described herein goes beyond the manual, potentially biased qualitative evaluation by quantifying the impacts of each feature, in a technical way, on the overall location quality based on rental income.

Processing stage 212, in some examples, can also calculate bucket-level importance ratios 238 for groups of features in geographic areas at each granularity level. In some implementations, location features can be grouped into bucket categories which include two or more of economics, demographics, transit, labor market, and rental market. For example, a population density feature and a percentage of population with advanced degrees feature are assigned to the demographics bucket. For each bucket, the bucket-level importance is the sum of feature-level importance values, across all features belonging to the respective bucket. In one example, feature-level importance is distinct from the feature-level score and corresponds to the absolute value of the feature-level Shapley value. The feature-level importance, in some examples, measures the importance of one feature through the trained machine learning model and all the considered location features. In some aspects, the bucket-level importance ratio is calculated as follows:

$$\frac{\text{Bucket - level importance}}{\sum_{\text{all buckets}} \text{Bucket - level importance}}$$

In some embodiments, processing stage 212 can also perform trend analysis 240 for location quality scores and/or feature-level raw values and scores. For the location quality score, users can find out the trended location score for previous years, by clicking "trend" button 520 on user interface screen 520 (FIG. 5) next to the displayed most up-to-date location score. With such trend information, users can have a retrospective view of previous results and can identify any upward or downward trends of rental income in the areas of interest. In addition, for each feature, users can find out the raw feature-level values and feature-level scores for the previous years. In some examples, this trend information helps users to identify the drivers for the upward, or downward trends of location quality.

In some implementations, process 200 also includes an interactive user interface stage 214 that generates one or more user interface screens for interaction with the location evaluation system 108. In some examples, the interactive user interface stage 214 performs substantially the same actions as user interface engine 146 (FIG. 1). In some examples, user interface stage 214 causes display of location feature information and product results generated by processing stage 212. User interface stage also allows customized searches by users 102 via a web-based server portal that allows users to log in to access a UI website and conduct customized searches at multiple granularity levels (e.g., census tract, zip code, county, MSA), as described above for FIGS. 4 through 6. In one example as shown in FIG. 5, when a user 102 clicks any census tract (e.g., census tract 510), a tract results panel 502 automatically updates, in real-time, one or more types of information related to the location quality of the census tract. In one example, results panel 502 displays a nationwide quality score 512, MSA percentile ranking 514, an information table 516 listing a raw value and feature-level location score for each location feature, and a pie chart 518 showing a bucket-level importance ratio for each bucket. In some examples, each bucket is displayed in its own respective color with all features belonging to the respective bucket being color-coded in the same color in the information table 516.

At user feedback stage 216, the process 200 collects real-time user actions through the user interface. At the UI website, in some examples, chat input box is provided (input box 606 in FIG. 6) to encourage users 102 to leave comments-anything they would like to add, remove, or change from the system 108 and corresponding user interface screens, and why. Stage 216 collects and analyzes the feedback comments and then transforms the received feedback into information that can be used in model/product refinement and improvement.

Figure 3:
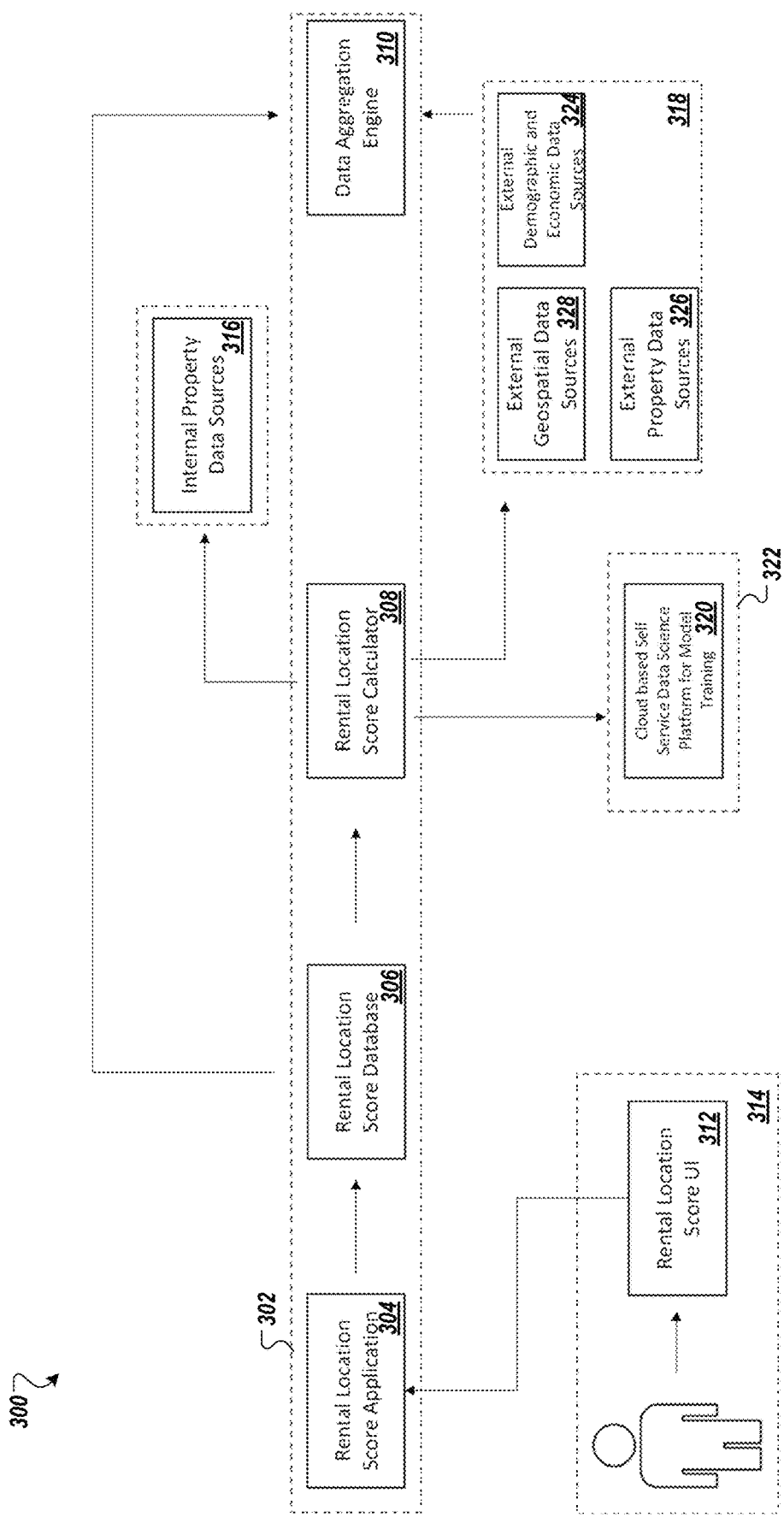
FIG. 3 illustrates a diagram of a data architecture for a location evaluation platform.

Turning to FIG. 3, a data architecture for aspects of a location evaluation platform 300 is illustrated. In some implementations, the platform 300 can be an example implementation of the system 108 shown in FIG. 1. The platform 300, in some examples, can include a location score engine 302 that includes a location score application 304, a location score database 306, a location score calculator 308, and a data aggregation engine 310. In some embodiments, location score application 304 generates user interfaces and interactive experience that are presented at an application user interface 312 on an end user device 314. For example, via application user interface 312, an end user can select geographic areas (e.g., census tract, zip code, county, MSA) and view location scores and feature-level scores at an external device. In some examples, the location score application 304 interacts with a web-based server portable to allow all applicable user interfaces to be displayed within the web-based application. In some implementations, the location score application 304 provides each user 102 with a customized experience in response to user interactions with the application 304.

In some examples, location score application 304 uses location score database 306 as the data source for location and analytical information presented at the application user interface 312. In some examples, location score database 306 can obtain data for use by rental location score application 304 via data aggregation engine 310 and location score calculator 308. In some embodiments, location score calculator 308 ingests data from internal data sources 316 (e.g., collateral financial data set (CFDS)) and external data sources 318 (e.g., geospatial data sources 328, demographic and economic data sources 324, and property data sources 326) to generate customized feature sets for training and applying to a machine learning model platform 320 of a model development infrastructure 322 that determines location scores for multiple granularity levels from trained machine learning data models for each granularity level.

In some embodiments, the location evaluation platform 300 can be integrated with other computing platforms in an underwriting and/or risk evaluation system. For example, the location scoring model/algorithm can complement other risk analysis and loan processing tools for various loan products.

Figure 9:
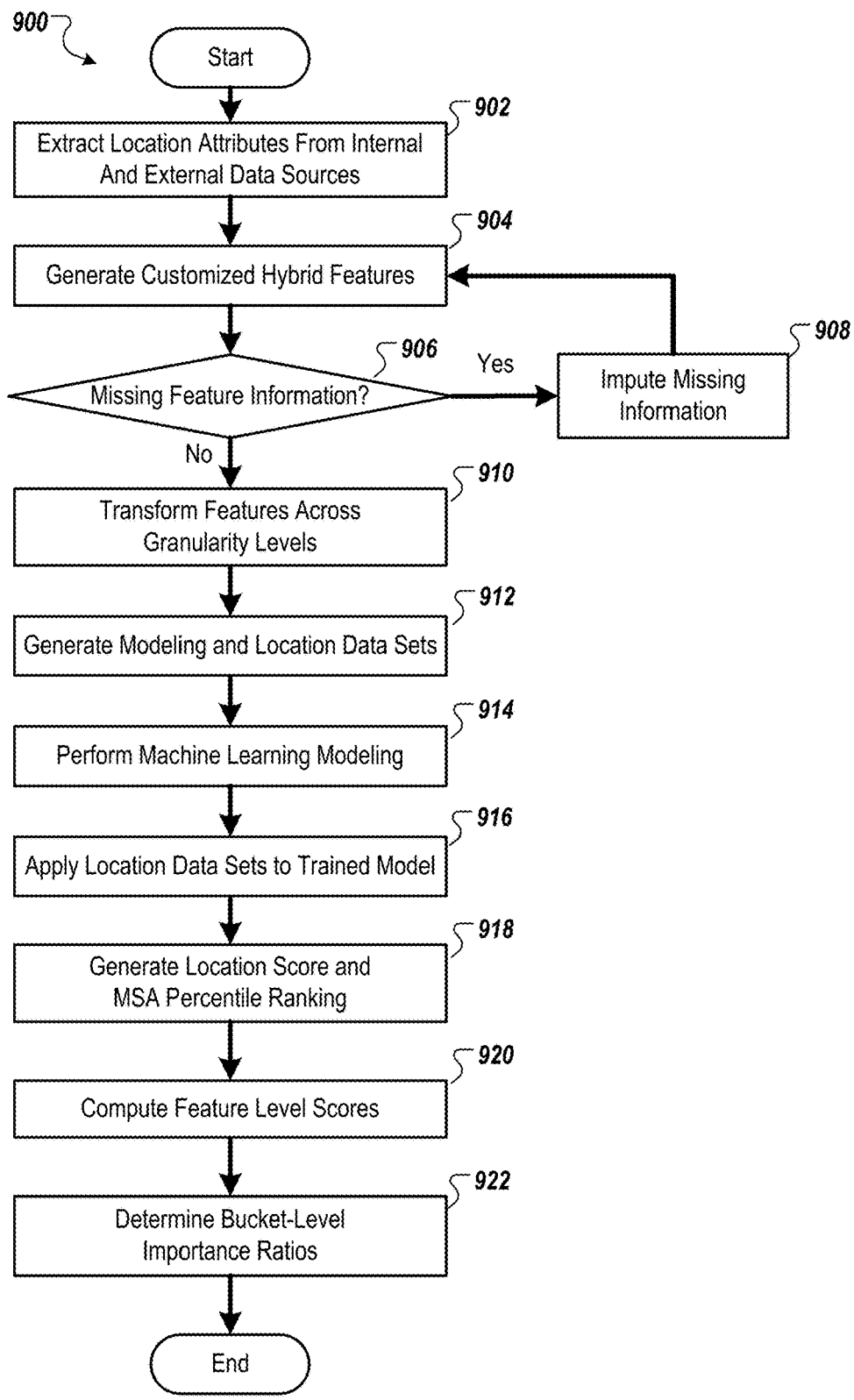
FIG. 9 is a flow chart of an example method of performing location evaluations from customized feature sets.
Figure 10:
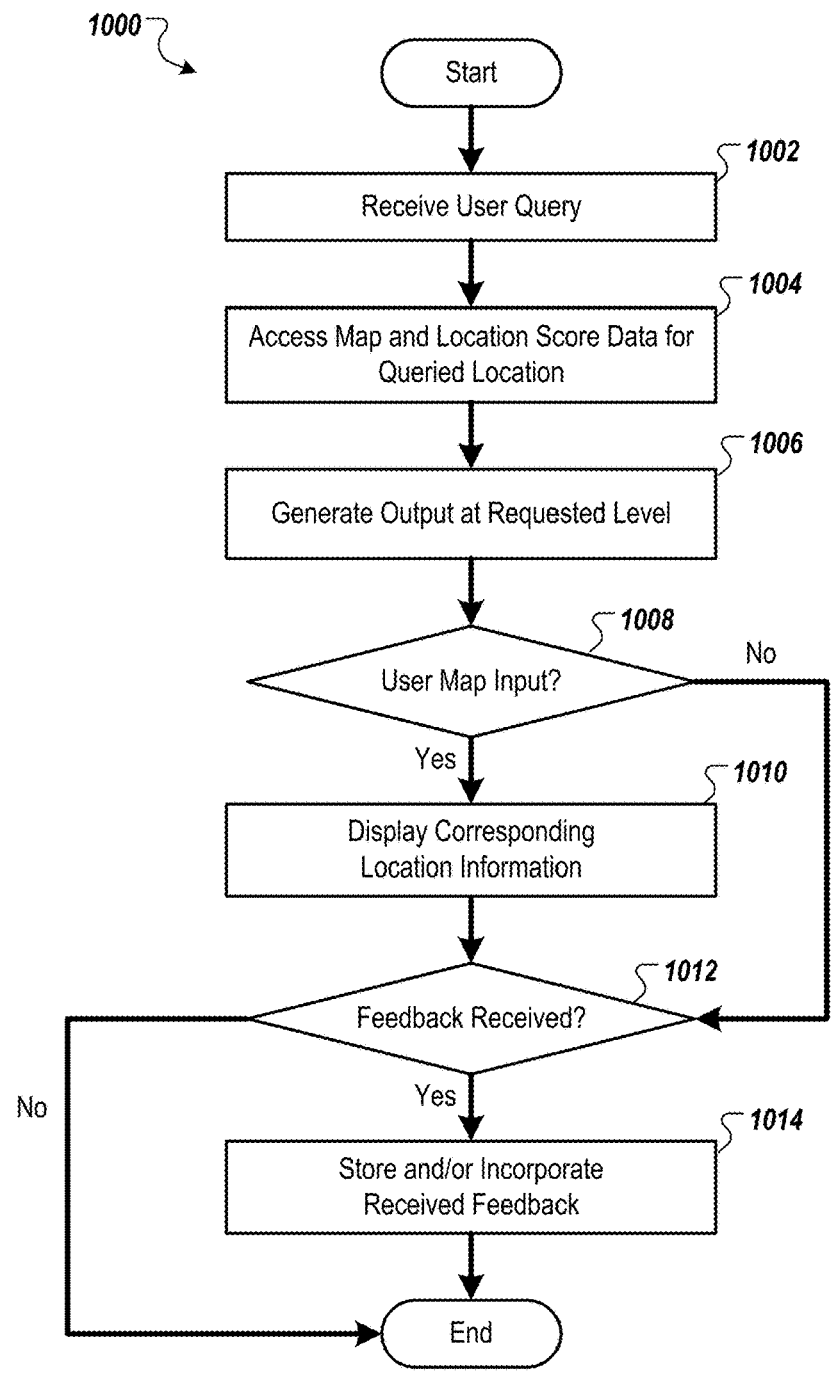
FIG. 10 is a flow chart of an example method of performing location evaluations from customized feature sets.

Turning to FIGS. 9 and 10, flow charts of example processes performed by the location evaluation system 108 are illustrated. For example, FIG. 9 shows a flow chart of an example method 900 of performing location evaluations from customized feature sets. In some examples, the method 900 may be performed by one or more of data mining and collection engine 132, geospatial calculation engine 134, data transformation engine 142, analytics engine 144, rent prediction engine 136, missing data imputation engine 152, feature selection engine 150, location quality engine 154, feature importance engine 158, and/or feature score calculation engine 162.

In some examples, the method 900 commences with extracting location attributes from internal data sources 111 and/or external data sources as entries of location feature sets (902). In one example, data mining and collection engine 132 extracts data from internal data sources (e.g., CFDS data) and external data sources 106 (as shown above in Table 1). In some implementations, from the extracted data, data transformation engine 142 can generate customized hybrid feature variables that improve the accuracy of rental income and location quality calculations (904). In some examples, data transformation engine 142 and geospatial calculation engine 134 create hybrid variables by combining multiple data types (e.g., geographic and economic data) into one or more individual variables to better capture and quantify the drivers of multifamily rental income. For example, distances from a property location to highways, metros, universities, or businesses may significantly impact multifamily rental income.

In some implementations, if any feature information for a feature variable in the feature sets is missing (906), then missing data imputation engine 152 performs one or more data imputation processes to fill in the missing variables (908). In some examples, property features may be missing due to lack of information in census surveys or due to there being an insufficient number of multifamily properties within a given census tract. Where there are no multifamily properties in a census tract, the distance-based hybrid feature variables are missing (e.g., distances to metro, highway, universities). To mitigate the missing features, missing data imputation engine 152 can fill in the missing features using one or more imputation technique. In some examples, missing data can be imputed with neighbor census tract information by leveraging geospatial techniques to detect neighboring census tracts and then use the median of its neighbors to impute the missing feature values. In some implementations where a census tract lacks multifamily properties, the center of the census tract may be used to calculate the distance to transportation and amenities. For distance-based variables where a given feature does not exist within a predetermined region (e.g., no metro within a given MSA associated with the census tract), the missing data imputation engine 152 may assume that the distance to the respective feature is infinity such that the correspondence distance variable is set to zero (inverse of true distance).

Data transformation engine 142, in some implementations, transforms feature variables across granularity levels (e.g., census tract, zip code, county, MSA) so that each feature exists at each granularity level (910). This ensures that machine learning data models can be trained for each granularity level regardless of the granularity level with which granularity level a given feature variable is associated with when extracted from the internal data sources 111 and/or external data sources 112. In some embodiments, data aggregation engine 156 combines the extracted feature variables and newly generated hybrid variables into customized modeling data sets and location score calculation data sets (912). In one example, the customized feature variable sets include feature variables 706-750 shown in FIG. 7.

In some implementations, analytics engine 144 performs machine learning modeling by training XGBoost data models with the modeling data sets (914). As discussed above, the modeling data sets include a set of input variables and output variables that are used to train the XGBoost data models to predict rental incomes and identify which feature variables have the biggest impact on the rental income/location quality scores. Analytics engine 144, in some embodiments, applies location score calculation data sets to the respective trained XGBoost model to calculate rental incomes (log scale) that can be translated into location quality scores and MSA percentile ranking (918), feature-level sores (920), and feature importance information for each census tract and/or other location region in other location granularity levels (916). In some implementations, the feature importance information can be categorized into categorical buckets (922). In some implementations, location features can be grouped into bucket categories which include two or more of economics, demographics, transit, labor market, and rental market. For each bucket, the bucket-level importance is the sum of feature-level importance values, across all features belonging to the respective bucket. In one example, feature-level importance is distinct from the feature-level score and corresponds to the absolute value of the feature-level Shapley value. The feature-level importance, in some examples, measures the importance of one feature through the trained machine learning model and all the considered location features.

Although illustrated in a particular series of events, in other implementations, the steps of the location evaluation process 900 may be performed simultaneously or in a different order. For example, generating location scores and MSA percentile rankings (918), computing feature level scores (920), and determining bucket-level importance ratios (922) can be performed in any order. Further, one or more of the missing data derivation techniques may be omitted from the process. For example, one or more of the steps 918, 920, 922 may be omitted. Additionally, in other embodiments, the process may include more or fewer steps while remaining within the scope and spirit of the location evaluation process 900.

FIG. 10 shows a flow chart of an example method 1000 of generating location score results in response to user queries. In some examples, the method 1000 may be performed by one or more of data management engine 130, user interface engine 146, and/or feedback collection engine 148. In some implementations, the method 1000 commences with receiving a user location quality query via a user interface screen input (e.g., search panel 402 at UI screen 400 in FIG. 4) (1002). In response to receiving the query, in some examples, user interface engine 146 accesses map and location score data for the queried location from data repository 110 (1004). In some implementations, location score result information is displayed within one or more user interface screens at the requested granularity level (1006). For example, in response to receiving a location quality query at search input panel 402, UI screen 500 (FIG. 5) can display a results panel 502 and map information bubble 522 that shows tract information for tract 504 and rental income drivers in real time as determined by the trained machine learning algorithms. In some examples, if a user moves an input cursor to another census tract displayed on a map portion of UI screen 500 (1008), then user interface engine 146 can be configured to automatically adjust the information displayed at information bubble 522 or results panel 502 in real-time (1010). In this way, the UI screen 500 is dynamically updatable in response to user inputs and can give users a clearer picture of variation in location quality across a MSA or displayed geographic region.

In some embodiments, if a user provides feedback at chat input box in feedback panel 602 of the UI screen (1012), then feedback collection engine 148 and feedback learning engine 160 collect and analyze the feedback comments and transform the received feedback into information that can be used in model/product refinement and improvement (1014).

Although illustrated in a particular series of events, in other implementations, the steps of the location score generation process 1000 may be performed simultaneously or in a different order. For example, receiving and incorporating user feedback (1012, 1014) may be performed before outputs are generated at the requested level (1006). Further, one or more of the missing data derivation techniques may be omitted from the process (e.g., storing and incorporating received feedback (1014)). Additionally, in other embodiments, the process may include more or fewer steps while remaining within the scope and spirit of the location score generation process 1000.

In some embodiments, the implementations described herein can be used in other applications such as post-origination analysis or benchmarking of property performance. The systems and methods described herein can also be used to identify clusters of locations or clusters of properties that reside in comparable locations with comparable location qualities (for example, commercial and residential tenants looking to rent—as opposed to invest or lend—in a commercial real estate building).

Figure 11:
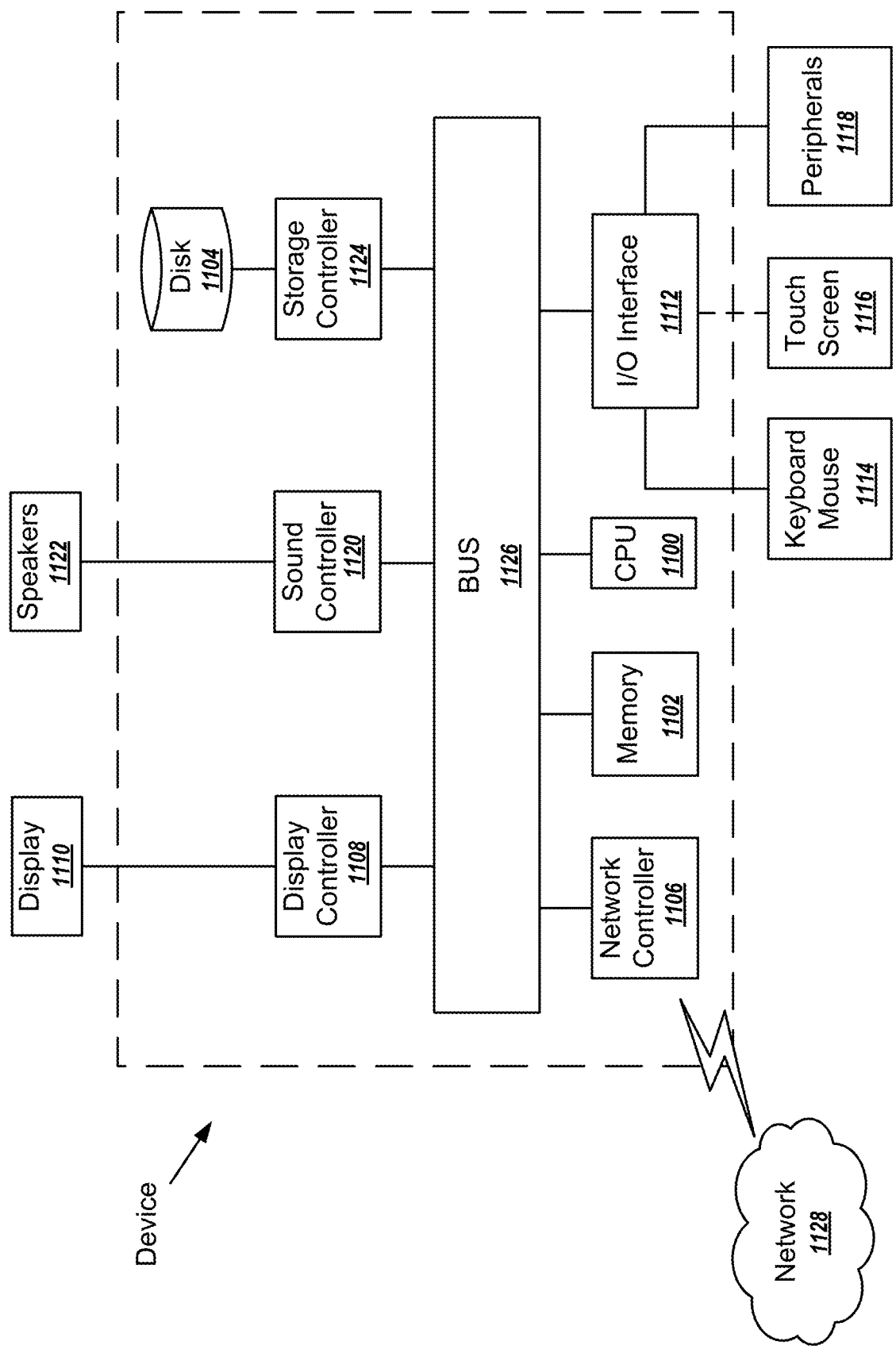
FIG. 11 is a block diagram of an example computing system.

Next, a hardware description of a computing device, mobile computing device, computing system, or server according to exemplary embodiments is described with reference to FIG. 11. The computing device, for example, may represent the users 102, external data sources 106, or one or more computing systems supporting the functionality of the location evaluation system 108, as illustrated in FIG. 1. In FIG. 11, the computing device, mobile computing device, or server includes a CPU 1100 which performs the processes described above. The process data and instructions may be stored in memory 1102. The processing circuitry and stored instructions may enable the computing device to perform, in some examples, methods 900 and 1000 of FIGS. 9 and 10. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 1104, in some examples, may store the contents of the data repository 110 of FIG. 1, as well as the data maintained by the users 102, and external data sources 106 prior to accessing by the location evaluation system 108 and transferring to the data repository 110.

Further, a portion of the claimed advancements may be provided as a utility application, background daemon, or component of an operating system, or combination thereof, executing in conjunction with CPU 1100 and an operating system such as Microsoft Windows, UNIX, Solaris, LINUX, Apple MAC-OS and other systems known to those skilled in the art.

CPU 1100 may be a Xeon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 1128, for example, may support communications between the location evaluation system 108 and any one of the users 102 or external data sources 106.

The computing device, mobile computing device, or server further includes a display controller 1108, such as a NVIDIA Geforce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard. The display controller 1108 and display 1110 may enable presentation of user interfaces for submitting requests to the location evaluation system 108.

A sound controller 1120 is also provided in the computing device, mobile computing device, or server, such as Sound Blaster X-Fi Titanium from Creative, to interface with speakers/microphone 1122 thereby providing sounds and/or music.

The controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
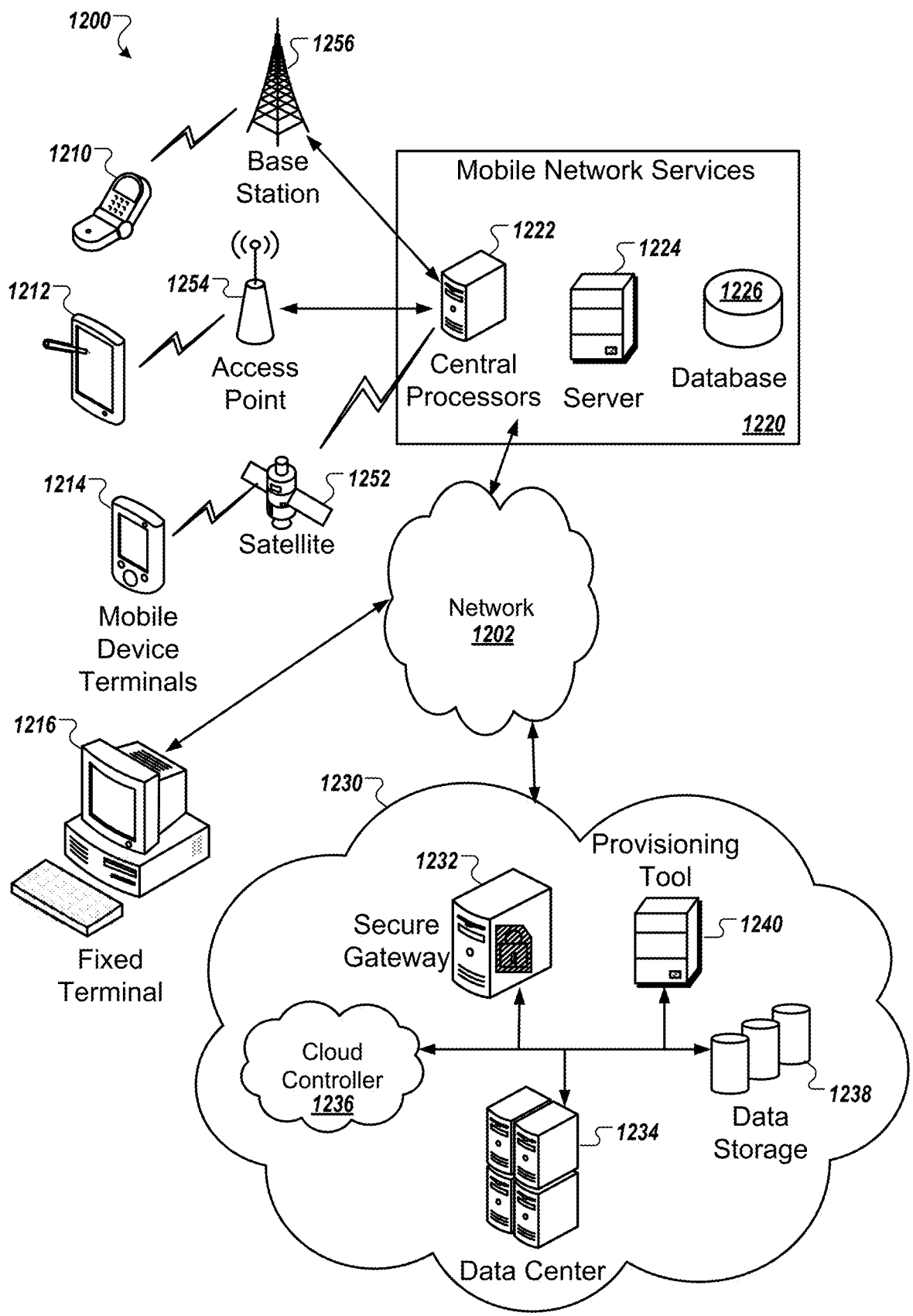
FIG. 12 is a block diagram of an example distributed computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the computing devices described herein may interface with a cloud computing environment 1230, such as Google Cloud Platform™ to perform at least portions of methods or algorithms detailed above. The processes associated with the methods described herein can be executed on a computation processor, such as the Google Compute Engine by data center 1234. The data center 1234, for example, can also include an application processor, such as the Google App Engine, that can be used as the interface with the systems described herein to receive data and output corresponding information. The cloud computing environment 1230 may also include one or more databases 1238 or other data storage, such as cloud storage and a query database. In some implementations, the cloud storage database 1238, such as the Google Cloud Storage, may store processed and unprocessed data supplied by systems described herein. For example, internal data 111, external data 112, rental location scores 114, combined data 116, feature data and weights 118, missing data rules 120, and data transformation rules 122 may be maintained by the location evaluation system 108 of FIG. 1 in a database structure such as the databases 1238.

The systems described herein may communicate with the cloud computing environment 1230 through a secure gateway 1232. In some implementations, the secure gateway 1232 includes a database querying interface, such as the Google BigQuery platform. The data querying interface, for example, may support access by the location evaluation system 108 to data stored on any one of the users 102.

The cloud computing environment 1230 may include a provisioning tool 1240 for resource management. The provisioning tool 1240 may be connected to the computing devices of a data center 1234 to facilitate the provision of computing resources of the data center 1234. The provisioning tool 1240 may receive a request for a computing resource via the secure gateway 1232 or a cloud controller 1236. The provisioning tool 1240 may facilitate a connection to a particular computing device of the data center 1234.

A network 1202 represents one or more networks, such as the Internet, connecting the cloud environment 1230 to a number of client devices such as, in some examples, a cellular telephone 1210, a tablet computer 1212, a mobile computing device 1214, and a desktop computing device 1216. The network 1202 can also communicate via wireless networks using a variety of mobile network services 1220 such as Wi-Fi, Bluetooth, cellular networks including EDGE, 3G, 4G, and 5G wireless cellular systems, or any other wireless form of communication that is known. In some examples, the wireless network services 920 may include central processors 1222, servers 1224, and databases 1226. In some embodiments, the network 1202 is agnostic to local interfaces and networks associated with the client devices to allow for integration of the local interfaces and networks configured to perform the processes described herein. Additionally, external devices such as the cellular telephone 1210, tablet computer 1212, and mobile computing device 1214 may communicate with the mobile network services 1220 via a base station 1256, access point 1254, and/or satellite 1252.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:
1. A system comprising:
a non-transitory computer readable medium;
one or more processing devices and/or processing circuitry; and
computing logic comprising at least one of i) hardware logic programmed into the one or more processing devices or ii) software logic stored to a non-transitory computer readable medium and configured for executing on the one or more processing devices and/or the processing circuitry, wherein the computing logic, when executed, is configured to
generate a plurality of customized training data sets for training a set of location quality prediction models, wherein
each customized training data set of the plurality of customized training data sets comprises data values corresponding to each feature variable of a plurality of feature variables, wherein
the plurality of feature variables comprises a plurality of demographic and/or economic feature variables, a plurality of neighborhood-level feature variables, and a plurality of property-level feature variables,
each customized training data set is applicable to a) a respective predefined geographic region of a plurality of predefined geographic regions and b) a respective granularity level of a plurality of geographic granularity levels of geographic regions, wherein
the plurality of geographic granularity levels comprises one or more of a zip code level, a county level, a metropolitan statistical area (MSA) level, or a census tract level, and
generating the plurality of customized training data sets comprises, for each geographic region of the plurality of predefined geographic regions,
extracting, from a plurality of data sources, a respective regional data set associated with the respective predefined geographic region,
identifying, within the respective regional data set, a plurality feature values applicable to a particular geographic granularity level of the plurality of geographic granularity levels, and
generating, from the plurality feature values applicable to the particular geographic granularity level, a respective plurality of resized feature values appropriate to each geographic granularity level of at least one additional geographic granularity level of the plurality of geographic granularity levels of geographic regions,
for each respective location quality prediction model of the set of location quality prediction models, train the respective location quality prediction model using a respective customized training data set of the plurality of customized training data sets, wherein
each location quality prediction model of a first portion of the set of location quality prediction models is trained to measure a relationship between rental income and at least a portion of the plurality of feature variables within i) at least one respective predefined geographic region of the plurality of predefined geographic regions and ii) at a respective geographic granularity level of the plurality of geographic granularity levels of geographic regions,
receive location feature data from a plurality of data sources, wherein a respective portion of the location feature data from each respective data source of the plurality of data sources is provided at a respective geographic granularity level of the plurality of geographic granularity levels,
generate, from the location feature data, a plurality of first customized location feature sets for applying to the set of trained location quality prediction models, each customized location feature set of the plurality of first customized location feature sets comprising data values corresponding to each feature variable of at least a portion of the plurality of feature variables, wherein
each location feature set of the plurality of first customized location feature sets is associated with a respective first predefined region of a plurality of first predefined regions spanning a geographic area, wherein
the plurality of first predefined regions is sized to a first geographic granularity level of the plurality of geographic granularity levels, and
generating the plurality of first customized location feature sets includes generating a portion of the data values corresponding to one or more hybrid variables of the plurality of feature variables by combining aspects of two or more items of the location feature data into a single hybrid variable of the one or more hybrid variables,
transform data values of at least a portion of the plurality of first customized location feature sets to generate each respective location feature set of at least a portion of a plurality of second customized location feature sets, wherein each location feature set of the plurality of second customized location feature sets is associated with a respective second predefined region of a plurality of second predefined regions spanning the geographic area, wherein
the plurality of second predefined regions is sized to a second geographic granularity level of the plurality of geographic granularity levels, and
transforming the data values comprises, for each respective predefined region of the plurality of second predefined regions identifying two or more regions of the plurality of first predefined regions each partially overlapping a geographic location of the respective predefined region, and for each variable of at least a portion of the plurality of feature variables, aggregating at least a portion of the data values corresponding to each region of the two or more regions, for each respective customized location feature set of the plurality of first customized location feature sets and the plurality of second customized location feature sets, apply the respective customized location feature set to a corresponding machine learning data model of the set of trained location quality prediction models, wherein the corresponding machine learning data model is trained to predict rental property income at the geographic granularity level associated with the respective customized location feature set, and calculate, from output data generated by the corresponding machine learning data model, one or more location metrics quantifying a rental property income for the respective predefined geographic region associated with the respective customized location feature set, and present, in real-time at one or more user interface screens in response to receiving a query from an external device of a user, the one or more location metrics for each predefined region of one or more predefined regions of the plurality of first predefined regions and one or more predefined regions of the plurality of second predefined regions.

2. The system of claim 1, wherein each variable of at least one of the one or more hybrid variables combines geospatial feature data with one or more items of economic data or demographic data.

3. The system of claim 2, wherein the one or more hybrid variables comprises at least one of a distance to a metro station or a distance to a highway.

4. The system of claim 1, wherein the first geographic granularity level of the plurality of geographic granularity levels is a census tract level.

5. The system of claim 4, wherein further geographic granularity levels of the plurality of geographic granularity levels comprise a zip code granularity level, a county granularity level, and a metropolitan statistical area (MSA) granularity level.

6. The system of claim 1, wherein the one or more location metrics comprise a rental income prediction score, a metropolitan statistical area (MSA) ranking percentile, and a location quality score.

7. The system of claim 1, wherein the one or more location metrics comprise a feature-level score for each feature variable of the plurality of feature variables that impacts the rental property income at the respective predefined geographic region.

8. The system of claim 1, wherein the corresponding machine learning data model is an Extreme Gradient Boosting (XGBoost) data model.

9. The system of claim 1, wherein the plurality of data sources includes two or more of external geospatial data sources, external demographic data sources, or external economic data sources.

10. A method, comprising:
generating, by processing circuitry, a plurality of customized training data sets for training a set of location quality prediction models, wherein
each customized training data set of the plurality of customized training data sets comprises data values corresponding to each feature variable of a plurality of feature variables, wherein
the plurality of feature variables comprises a plurality of demographic and/or economic feature variables, a plurality of neighborhood-level feature variables, and a plurality of property-level feature variables,
each customized training data set is applicable to a) a respective predefined geographic region of a plurality of predefined geographic regions and b) a respective geographic granularity level of a plurality of geographic granularity levels of geographic regions, wherein
the plurality of geographic granularity levels comprises one or more of a zip code level, a county level, a metropolitan statistical area (MSA) level, or a census tract level, and
generating the plurality of customized training data sets comprises, for each respective geographic region of the plurality of predefined geographic regions,
extracting, from a plurality of data sources, a respective regional data set associated with the respective geographic region,
identifying, within the respective regional data set, a plurality feature values applicable to a particular geographic granularity level of the plurality of geographic granularity levels, and
generating, from the plurality feature values applicable to the particular geographic granularity level, a respective plurality of resized feature values appropriate to each geographic granularity level of at least one additional geographic granularity level of the plurality of geographic granularity levels,
for each respective location quality prediction model of the set of location quality prediction models, training, by the processing circuitry, the respective location quality prediction model using a respective customized training data set of the plurality of customized training data sets, wherein
each location quality prediction model of a first portion of the set of location quality prediction models is trained to measure a relationship between rental income and at least a portion of the plurality of feature variables within i) at least one respective predefined geographic region of the plurality of predefined geographic regions and ii) at a respective geographic granularity level of the plurality of geographic granularity levels,
receiving location feature data from a plurality of data sources, wherein a respective portion of the location feature data from each respective data source of the plurality of data sources is provided at a respective geographic granularity level of the plurality of geographic granularity levels;
generating, by the processing circuitry from the location feature data, a plurality of first customized location feature sets for applying to the set of trained location quality prediction models, each customized location feature set of the plurality of first customized location feature sets comprising data values corresponding to each feature variable of at least a portion of the plurality of feature variables, wherein
    each location feature set of the plurality of first customized location feature sets is associated with a respective first predefined region of a plurality of first predefined regions spanning a geographic area, wherein
        the plurality of first predefined regions is sized to a first geographic granularity level of the plurality of geographic granularity levels, and
    generating the plurality of first customized location feature sets includes generating a portion of the data values corresponding to one or more hybrid variables of the plurality of feature variables by combining aspects of two or more items of the location feature data into a single hybrid variable of the one or more hybrid variables;
transforming, by the processing circuitry, data values of at least a portion of the plurality of first customized location feature sets to generate each respective location feature set of at least a portion of a plurality of second customized location feature sets, wherein each location feature set of the plurality of second customized location feature sets is associated with a second predefined region of a plurality of second predefined regions spanning the geographic area, wherein
    the plurality of second predefined regions is sized to a second geographic granularity level of the plurality of geographic granularity levels, and
    transforming the data values comprises, for each respective predefined region of the plurality of second predefined regions
        identifying two or more regions of the plurality of first predefined regions each partially overlapping a geographic location of the respective predefined region, and
        for each variable of at least a portion of the plurality of feature variables, aggregating at least a portion of the data values corresponding to each region of the two or more regions;
for each respective customized location feature set of the plurality of first customized location feature sets and the plurality of second customized location feature sets,
    applying, by the processing circuitry, the respective customized location feature set to a corresponding machine learning data model of the set of trained location quality prediction models trained to predict rental property income at the geographic granularity level associated with the respective customized location feature set, and
    calculating, by the processing circuitry from output data generated by the corresponding machine learning data model, one or more location metrics quantifying a rental property income for the respective predefined geographic region associated with the respective customized location feature set; and
presenting, by the processing circuitry in real-time at one or more user interface screens in response to receiving a query from an external device of a user, the one or more location metrics for each predefined region of one or more predefined regions of the plurality of first predefined regions and one or more predefined regions of the plurality of second predefined regions.

11. The method of claim 10, wherein each variable of at least one of the one or more hybrid variables combines geospatial feature data with one or more items of economic data or demographic data.

12. The method of claim 11, wherein the one or more hybrid variables comprise at least one of a distance to a metro station or a distance to a highway.

13. The method of claim 10, wherein the first geographic granularity level of the plurality of geographic granularity levels is a census tract level.

14. The method of claim 13, wherein further geographic granularity levels of the plurality of geographic granularity levels comprise a zip code granularity level, a county granularity level, and a metropolitan statistical area (MSA) granularity level.

15. The method of claim 10, wherein the one or more location metrics comprise a rental income prediction score, metropolitan statistical area (MSA) ranking percentile, and location quality score.

16. The method of claim 10, wherein the one or more location metrics comprise a feature-level score for each feature variable of the plurality of feature variables that impacts the rental property income at the respective predefined geographic region.

17. The system of claim 1, wherein the second geographic granularity level is smaller than the first geographic granularity level.

18. The system of claim 1, wherein aggregating comprises calculating a weighted average of the data values corresponding to each region of the two or more regions.

19. The system of claim 1, wherein transforming the data values to generate each respective location feature set of one or more of the plurality of second customized location feature sets comprises imputing, based on data values of one or more neighboring regions of the plurality of second predefined regions, data values for one or more variables of the plurality of feature variables.

20. The system of claim 1, wherein:
the output data comprises a plurality of rental income values per unit per month on a logarithmic scale; and
calculating the one or more location metrics comprises transforming at least one rental income value per unit per month of the plurality of rental income values per unit per month to a linear scale.

21. The system of claim 1, wherein:
the output data comprises a plurality of rental income values per unit per month on a logarithmic scale; and
calculating the one or more location metrics comprises calculating a set of feature scores, each feature score representing a contribution of a respective feature variable of at least a portion of the plurality of feature variables to rental income value.

\* \* \* \* \*